US012775354B2

(12) United States Patent
Alkhimova et al.

(10) Patent No.: US 12,775,354 B2
(45) Date of Patent: Oct. 27, 2026

(54) ELECTRONIC APPARATUS AND METHOD OF ACQUIRING TOUCH COORDINATES THEREOF

(71) Applicant: SAMSUNG ELECTRONICS CO., LTD., Suwon-si (KR)

(72) Inventors: Svitlana Alkhimova, Kyiv (UA); Dmytro Sydorenko, Kyiv (UA); Vitalii Klimov, Kyiv (UA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 162 days.

(21) Appl. No.: 18/376,058

(22) Filed: Oct. 3, 2023

(65) Prior Publication Data

US 2024/0143110 A1 May 2, 2024

Related U.S. Application Data

(63) Continuation of application No. PCT/KR2023/011374, filed on Aug. 2, 2023.

(30) Foreign Application Priority Data

Oct. 28, 2022 (KR) ........................ 10-2022-0141497

(51) Int. Cl.
*G06F 3/041* (2006.01)
*G06F 3/044* (2006.01)
(Continued)

(52) U.S. Cl.
CPC ............ *G06F 3/0418* (2013.01); *G06F 3/044* (2013.01); *G06N 3/04* (2013.01); *G06T 3/60* (2013.01);
(Continued)

(58) Field of Classification Search
CPC ........ G06F 3/0418; G06F 3/044; G06F 3/041; G06F 3/04186; G06N 3/04; G06N 3/08;
(Continued)

(56) References Cited

U.S. PATENT DOCUMENTS

| | | | |
|---|---|---|---|
| 8,791,921 | B2 | 7/2014 | Westerman |
| 10,088,947 | B2 | 10/2018 | Rosenberg et al. |

(Continued)

FOREIGN PATENT DOCUMENTS

| | | | |
|---|---|---|---|
| CN | 104077001 A | 10/2014 | |
| JP | 2019-156263 A | 9/2019 | |

(Continued)

OTHER PUBLICATIONS

Rohit Verma et al., "A Comparative Study of Various Types of Image Noise and Efficient Noise Removal Techniques", International Journal of Advanced Research in Computer Science and Software Engineering, vol. 3, Issue 10, Oct. 2013, pp. 617-622.

(Continued)

*Primary Examiner* — Deeprose Subedi
(74) *Attorney, Agent, or Firm* — Sughrue Mion, PLLC

(57) ABSTRACT

An electronic apparatus comprises: a display including a capacitive type touch screen; a memory storing at least one instruction; and at least one processor configured to be connected with the display and the memory, and control the electronic apparatus, wherein the at least one processor is configured to, by executing the at least one instruction: acquire an image including capacitive information corresponding to a touch input, and input the acquired image into an artificial intelligence model configured to output a touch coordinate corresponding to the touch input based on touch state information and touch type information determined from the image.

13 Claims, 29 Drawing Sheets

(51) Int. Cl.

*G06N 3/04* (2023.01)
*G06T 3/60* (2024.01)
*G06T 5/00* (2024.01)
*G06T 5/20* (2006.01)
*G06T 5/70* (2024.01)
*G06T 7/11* (2017.01)
*G06T 7/70* (2017.01)

(52) U.S. Cl.

CPC .................. *G06T 5/20* (2013.01); *G06T 5/70* (2024.01); *G06T 7/11* (2017.01); *G06T 7/70* (2017.01); *G06T 2207/20084* (2013.01)

(58) Field of Classification Search

CPC .. G06N 3/045; G06T 7/11; G06T 3/60; G06T 5/70; G06T 5/20; G06T 7/70; G06T 2207/20084

See application file for complete search history.

(56) References Cited

U.S. PATENT DOCUMENTS

| | | | | |
|---|---|---|---|---|
| 10,209,828 | B2 | 2/2019 | Kang et al. | |
| 10,254,888 | B2 | 4/2019 | Rosenberg et al. | |
| 10,642,414 | B2 | 5/2020 | Rosenberg et al. | |
| 11,023,075 | B2 | 6/2021 | Guarneri | |
| 11,163,394 | B2 | 11/2021 | Rosenberg et al. | |
| 11,269,456 | B1 | 3/2022 | Eilers et al. | |
| 11,635,839 | B2 | 4/2023 | Rosenberg et al. | |
| 2012/0062474 | A1* | 3/2012 | Weishaupt | G06F 3/04186 345/173 |
| 2013/0241887 | A1 | 9/2013 | Sharma | |
| 2015/0242009 | A1* | 8/2015 | Xiao | G06F 18/23213 345/174 |
| 2017/0300166 | A1 | 10/2017 | Rosenberg et al. | |
| 2019/0012038 | A1 | 1/2019 | Rosenberg et al. | |
| 2019/0196646 | A1 | 6/2019 | Rosenberg et al. | |
| 2020/0233520 | A1 | 7/2020 | Rosenberg et al. | |
| 2022/0019326 | A1 | 1/2022 | Rosenberg et al. | |
| 2022/0276762 | A1 | 9/2022 | Anderson | |
| 2023/0221816 | A1 | 7/2023 | Rosenberg et al. | |

FOREIGN PATENT DOCUMENTS

| | | |
|---|---|---|
| JP | 2021-12743 A | 2/2021 |
| JP | 2021-71830 A | 5/2021 |

OTHER PUBLICATIONS

Nikhil R. Pal et al., “A review on image segmentation techniques”, Pattern Recognition, vol. 26, Issue 9, 1993, pp. 1277-1294.

Nobuyuki Otsu, “A Threshold Selection Method from Gray-Level Histograms”, IEEE Transactions on Systems, Man, and Cybernetics, vol. 9, Issue 1, Jan. 1979, pp. 62-66.

Christian Holz et al., “Understanding Touch”, Proceedings of the SIGCHI Conference on Human Factors in Computing Systems, May 2011, 10 pages.

International Search Report and Written Opinion (PCT/ISA/210 and PCT/ISA/237) dated Nov. 23, 2023, issued by International Searching Authority for International Application No. PCT/KR2023/011374.

Abinaya Kumar et al., “Improving the Input Accuracy of Touchscreens using Deep Learning”, CHI EA ’19: Extended Abstracts of the 2019 CHI Conference on Human Factors in Computing Systems Paper No. LBW1514, May 2, 2019, pp. 1-6, https://doi.org/10.1145/3290607.3312928.

Communication issued Aug. 10, 2026 by the Korean Ministry of Intellectual Property for KR Patent Application No. 10-2022-0141497.

* cited by examiner

ELECTRONIC APPARATUS AND METHOD OF ACQUIRING TOUCH COORDINATES THEREOF

CROSS-REFERENCE TO RELATED APPLICATION(S)

This application is a bypass continuation of International Application No. PCT/KR2023/011374, filed on Aug. 2, 2023, which is based on and claims priority to Korean Patent Application No. 10-2022-0141497, filed on Oct. 28, 2022, in the Korean Intellectual Property Office, the disclosures of which are incorporated by reference herein in their entireties.

BACKGROUND

1. Field

The disclosure relates to an electronic apparatus and a controlling method thereof, and more particularly, to an electronic apparatus including a capacitive type touch screen, and a method of acquiring touch coordinates thereof.

2. Description of the Related Art

In current electronic devices such as a smartphone, a tablet, or a smart watch, a capacitive type touch screen is used. Various interactions with a touch screen can improve a user's UX experience. However, precision of touch recognition is an important factor for a user's interaction with a touch screen.

Touchscreens represent of contact area of touch as a point (e.g., touch coordinates) for further input processing. However, an error offset around an input target may occur due to different fingers or gestures used for touch, touch habits, orientations and grasping the devices. Due to the specific of the capacitive touchscreen technology, using devices with residual water on fingers (wet hands) or in the rain degrades touch performance even more.

Such factors thwart capacitive touchscreen technology. Moreover, a user will not have a desirable experience if the user's touch input is not properly reflected on the touch screen. Available approaches to signal processing do not provide expectable results. Equipping capacitive touchscreens with additional sensors may partially decrease the effect of difficult conditions while increasing the overall cost and size of a device.

SUMMARY

According to one or more embodiments, an electronic apparatus comprises: a display including a capacitive type touch screen; a memory storing at least one instruction; and at least one processor configured to be connected with the display and the memory, and control the electronic apparatus, wherein the at least one processor is configured to, by executing the at least one instruction: acquire an image including capacitive information corresponding to a touch input, and input the acquired image into an artificial intelligence model configured to output a touch coordinate corresponding to the touch input based on touch state information and touch type information determined from the image.

The at least one processor is configured to: apply noise filtering to the acquired image and acquire a pre-processed image, and input the pre-processed image into the artificial intelligence model and acquire the touch coordinate corresponding to the touch input.

The at least one processor is configured to: segment the image to which the noise filtering is applied into a plurality of areas, and acquire the pre-processed image including gray level information corresponding to the plurality of areas, and input the pre-processed image into the artificial intelligence model and acquire the touch coordinate information corresponding to the touch input.

The at least one processor is configured to: based on acquiring the image while the electronic apparatus is located in a first direction, apply noise filtering to the image and acquire the pre-processed image, and based on acquiring the image while the electronic apparatus is located in a second direction different from the first direction, apply noise filtering to the image and rotate the image to which the noise filtering is applied from the second direction to the first direction to acquire the pre-processed image.

The artificial intelligence model comprises: a first layer block configured to output touch state information, a second layer block configured to output touch type information, and a third layer block configured to output a touch coordinate, and wherein the artificial intelligence model is configured such that an output of the first layer block is provided to the second layer block, and an output of the second layer block is provided to the third layer block.

The first layer block is configured to output touch state information of at least one of a wet state or a dry state, and the second layer block is configured to output first type information of a finger touch or a non-finger touch, second type information of an entire finger touch, or a partial finger touch, or third type information of a thumb touch.

The artificial intelligence model further comprises: a first operation block configured to concatenate the output of the first layer block and the output of the second layer block, and a second operation block configured to concatenate the output of the third layer block and the output of the first operation block, and wherein the touch coordinate is acquired based on an output of the second operation block.

The first layer block, the second layer block, and the third layer block are each implemented as a convolution neural network (CNN), wherein the artificial intelligence model comprises: a first middle layer located between the first layer block and the second layer block, and a second middle layer located between the second layer block and the third layer block, and wherein the first middle layer and the second middle layer are implemented as a recurrent neural network (RNN).

The at least one processor is configured to: acquire a plurality of images including capacitive information corresponding to a plurality of touch inputs in which each touch input is input at a different time, input the plurality of images into the artificial intelligence model and acquire touch coordinates corresponding to the plurality of touch inputs, and the artificial intelligence model is configured to: based on the plurality of images being input into the first layer block, input an output of the first layer block into the first middle layer and input an output of the first middle layer into the second layer block, and input an output of the second layer block into the second middle layer and input an output of the second middle layer into the third layer block.

The artificial intelligence model further comprises: a third operation block concatenating an output of the first middle layer and an output of the second layer block, and a fourth operation block concatenating an output of the third layer block and an output of the second middle layer, and wherein the touch coordinates are acquired based on an output of the fourth operation block.

According to one or more embodiments, a method of acquiring touch coordinates of an electronic apparatus comprising a capacitive type touch screen, the method comprising: acquiring an image including capacitive information corresponding to a touch input; and inputting the acquired image into an artificial intelligence model configured to output a touch coordinate corresponding to the touch input based on touch state information and touch type information determined from the image.

The method further comprising applying noise filtering to the acquired image and acquiring a pre-processed image, wherein the acquiring the touch coordinate comprises: inputting the pre-processed image into the artificial intelligence model and acquiring the touch coordinate corresponding to the touch input.

The acquiring the pre-processed image further comprises: segmenting the image to which the noise filtering is applied into a plurality of areas, and acquiring the pre-processed image including gray level information corresponding to the plurality of areas, and the acquiring the touch coordinate comprises: inputting the pre-processed image into the artificial intelligence model and acquiring the touch coordinate information corresponding to the touch input.

The acquiring the pre-processed image comprises: based on acquiring the image while the electronic apparatus is located in a first direction, applying noise filtering to the image and acquiring the pre-processed image; and based on acquiring the image while the electronic apparatus is located in a second direction different from the first direction, applying noise filtering to the image and rotating the image to which the noise filtering is applied from the second direction to the first direction to acquire the pre-processed image.

According to one or more embodiments, a non-transitory computer readable medium storing a computer instruction causing at least one processor of an electronic apparatus to executed a method comprising: acquiring an image including capacitive information corresponding to a touch input; and inputting the acquired image into an artificial intelligence model configured to output a touch coordinate corresponding to the touch input based on touch state information and touch type information determined from the image.

The method further comprises applying noise filtering to the acquired image and acquiring a pre-processed image, wherein the acquiring the touch coordinate comprises: inputting the pre-processed image into the artificial intelligence model and acquiring the touch coordinate corresponding to the touch input.

The acquiring the pre-processed image further comprises: segmenting the image to which the noise filtering is applied into a plurality of areas, and acquiring the pre-processed image including gray level information corresponding to the plurality of areas, and the acquiring the touch coordinate comprises: inputting the pre-processed image into the artificial intelligence model and acquiring the touch coordinate information corresponding to the touch input.

The acquiring the pre-processed image comprises: based on acquiring the image while the electronic apparatus is located in a first direction, applying noise filtering to the image and acquiring the pre-processed image; and based on acquiring the image while the electronic apparatus is located in a second direction different from the first direction, applying noise filtering to the image and rotating the image to which the noise filtering is applied from the second direction to the first direction to acquire the pre-processed image.

The artificial intelligence model comprises: a first layer block configured to output touch state information, a second layer block configured to output touch type information, and a third layer block configured to output a touch coordinate, and wherein the artificial intelligence model is configured such that an output of the first layer block is provided to the second layer block, and an output of the second layer block is provided to the third layer block.

The first layer block is configured to output touch state information of at least one of a wet state or a dry state, and the second layer block is configured to output first type information of a finger touch or a non-finger touch, second type information of an entire finger touch, or a partial finger touch, or third type information of a thumb touch.

DETAILED DESCRIPTION

Figure 1A:
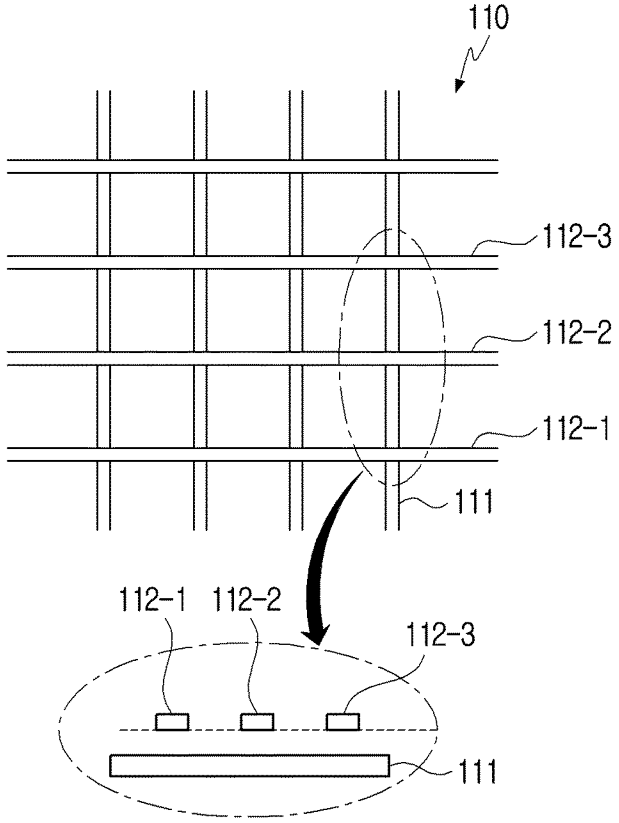
FIG. 1A to FIG. 1C are diagrams for illustrating an operation of a capacitive type touch screen according to one or more embodiments.

First, terms used in this specification will be described briefly, and then the disclosure will be described in detail.

As terms used in the embodiments of the disclosure, general terms that are currently used widely were selected as far as possible, in consideration of the functions described in the disclosure. However, the terms may vary depending on the intention of those skilled in the art, previous court decisions, or emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in this specification, expressions such as "have," "may have," "include," and "may include" denote the existence of such characteristics (e.g., elements such as numbers, functions, operations, and components), and do not exclude the existence of additional characteristics.

In addition, in the disclosure, the expressions "A or B," "at least one of A and/or B," or "one or more of A and/or B" and the like may include all possible combinations of the listed items. For example, "A or B," "at least one of A and B," or "at least one of A or B" may refer to all of the following cases: (1) including at least one A, (2) including at least one B, or (3) including at least one A and at least one B.

Further, the expressions "first," "second," and the like used in this specification may describe various elements regardless of any order and/or degree of importance. Also, such expressions are used only to distinguish one element from another element, and are not intended to limit the elements.

In addition, the description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element).

Also, the expression "configured to" used in the disclosure may be interchangeably used with other expressions such as "suitable for," "having the capacity to," "designed to," "adapted to," "made to," and "capable of," depending on cases. Meanwhile, the term "configured to" may not necessarily mean that an apparatus is "specifically designed to" in terms of hardware.

Meanwhile, under some circumstances, the expression "an apparatus configured to" may mean that the apparatus "is capable of" performing an operation together with another apparatus or component. For example, the phrase "a processor configured to perform A, B, and C" may mean a dedicated processor (e.g., an embedded processor) for performing the corresponding operations, or a generic-purpose processor (e.g., a CPU or an application processor) that can perform the corresponding operations by executing one or more software programs stored in a memory apparatus.

In addition, singular expressions include plural expressions, unless defined differently in the context. Also, in the disclosure, terms such as "include" and "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in the embodiments, "a module" or "a part" performs at least one function or operation, and may be implemented as hardware or software, or as a combination of hardware and software. Also, a plurality of "modules" or a plurality of "parts" may be integrated into at least one module and implemented as at least one processor, except "a module" or "a part" that needs to be implemented as specific hardware.

Meanwhile, various elements and areas in the drawings were illustrated schematically. Accordingly, the technical idea of the disclosure is not limited by the relative sizes or intervals illustrated in the accompanying drawings.

Hereinafter, one or more embodiments of the disclosure will be described in more detail with reference to the accompanying drawings.

Figure 1B:
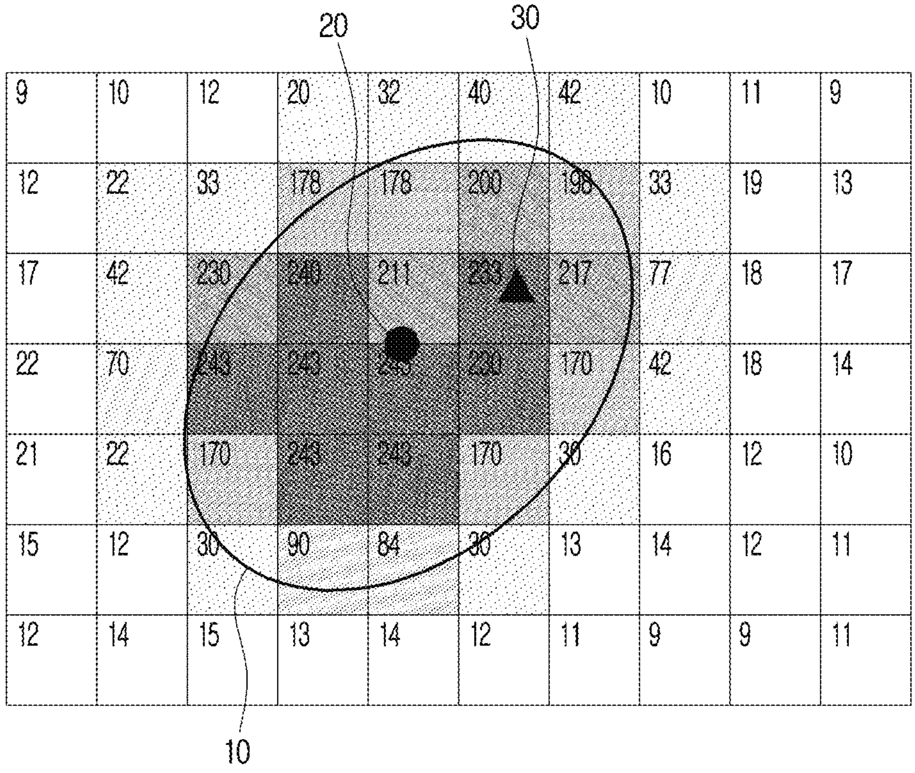
Figure 1C:
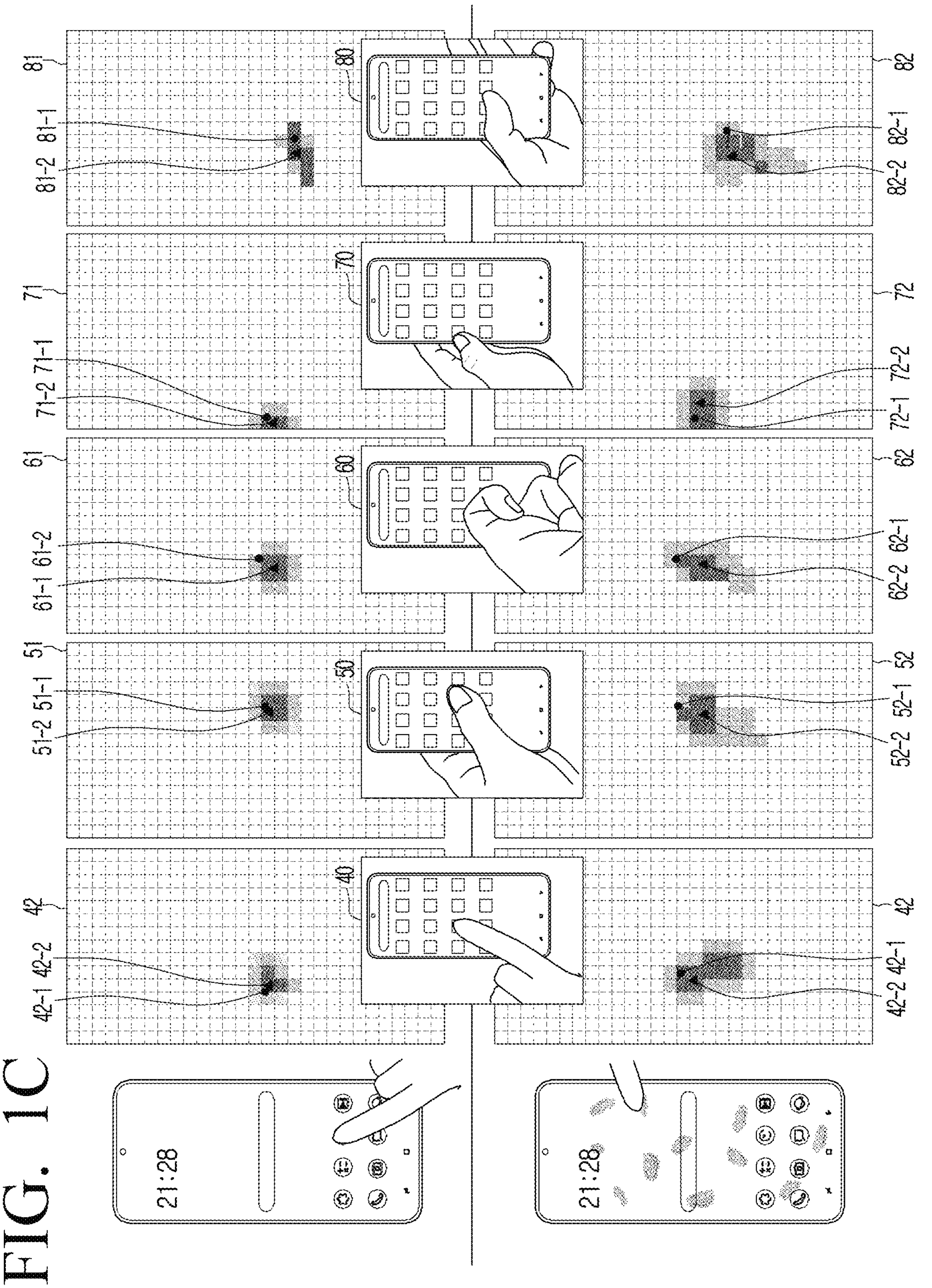

FIG. 1A to FIG. 1C are diagrams for illustrating an operation of a capacitive type touch screen according to one or more embodiments.

A capacitive type touch screen may produce very fine currents flow on the screen, and recognize a touch location by using the coordinate of an electrode on a part in which a change of the capacitance occurs based on a contact with a person's finger.

According to one or more embodiments, a capacitive type touch screen may have an electrode pattern structure as in FIG. 1A. The electrode pattern having grid patterns illustrated in FIG. 1A may include a vertical direction line 111 and horizontal direction lines 112-1, 112-2, 112-3. In one or more examples, a transmitter transmitting an electric field, and a receiver detecting a change of the electric field are divided, and a coordinate can be detected by detecting a change in the electric field due to a contact of a conductor. Specifically, when an electric field is output from an input apparatus 100, a change of the electric field may be detected in the electrode pattern. If a finger's contact is to be detected, a method of dividing an electrode in a first direction as a transmitter, and an electrode in a second direction as a receiver, from among electrodes in two intersecting directions, and causing the electrodes to function, may be used.

According to one or more embodiments, a capacitive type touch screen may be indicated by a point for performing additional input processing of each content area of a touch (e.g., a touch coordinate). However, an error offset of a slight degree may be generated around an input target. For example, as illustrated in FIG. 1B, an offset may be generated between a target touch location 10 and a detected touch location 20 in a touch area 10 by a user finger. Such an offset may vary according to a finger or a gesture used in a touch, a touch habit, a direction of a device, a habit of holding a device, etc.

According to one or more embodiments, due to the characteristics of a capacity type touch screen technology, the touch performance may become degraded in a case of touching with a wet hand, a case of touching in the rain, or a case of touching around an edge of the screen, etc. For example, as illustrated in FIG. 1C, in touch inputs 40, 50, 50, 70, 80 of various cases, compared to the cases of the dry touch screens 41, 51, 61, 71, 81 illustrated on the upper side, a relatively bigger offset may be generated in the cases of the wet touch screens 42, 52, 62, 72, 82. Here, a dry touch screen may be a case in which there is no moisture both on the user finger and the touch screen, and a wet touch screen may be a case in which there is moisture on at least one of the user finger or the touch screen. For example, a case of touching with an index finger 40, a case of touching with a thumb 50, a cases of touching with a knuckle 60, a case of touching an edge of the screen 70, and a case of touching with a side part of a finger 80 are assumed. In these cases, even in the cases of the dry touch screens 41, 51, 61, 71, 81, an offset may be generated between the target touch locations 41-1, 51-1, 61-1, 71-1, 81-1 and the detected touch locations 42-1, 52-1,

62-1, 72-1, 82-1. For example, in the case of holding a device with one hand, various offsets may be generated according to gestures that are not general such as a knuckle tap of touching with a knuckle, and contact geometry of touches that may vary during interacting with a thumb and other fingers. Furthermore, an offset between the target touch locations 42-1, 52-1, 62-1, 72-1, 82-1 and the detected touch locations 42-1, 52-1, 62-1, 72-1, 82-1 in the cases of the wet touch screens 42, 52, 62, 72, 82 may be relatively bigger than an offset between the target touch locations 41-1, 51-1, 61-1, 71-1, 81-1 and the detected touch locations 42-1, 52-1, 62-1, 72-1, 82-1 in the cases of the dry touch screens 41, 51, 61, 71, 81.

Accordingly, hereinafter, various embodiments in which precision of touch location detection can be improved without an additional sensor will be described.

Figure 2A:
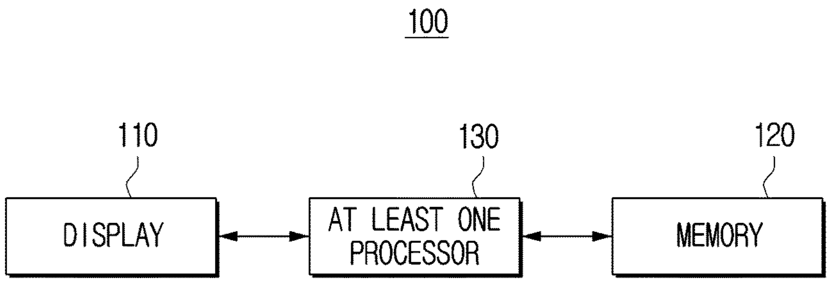
FIG. 2A is a block diagram illustrating a configuration of an electronic apparatus according to one or more embodiments.

FIG. 2A is a block diagram illustrating a configuration of an electronic apparatus according to one or more embodiments.

According to FIG. 2A, the electronic apparatus 100 includes a display 110, a memory 120, and at least one processor 130.

The electronic apparatus 100 may be implemented as an input panel such as a touch panel and a touch screen, or implemented as an electronic device such as a laptop computer, a mobile phone, a smartphone, an electronic board, digital signage, a PMP, an MP3 player, a game machine, a kiosk, a monitor, or any other known device including a touch panel or a touch screen.

The display 110 may be implemented as a display including self-luminescence elements, or a displaying including non-self-luminescence elements and a backlight. For example, the display 110 may be implemented as various forms of displays such as a liquid crystal display (LCD), an organic light emitting diodes (OLED) display, light emitting diodes (LED), a micro LED, a mini LED, a plasma display panel (PDP), a quantum dot (QD) display, quantum dot light-emitting diodes (QLED), or any other known display. Inside the display 110, driving circuits that may be implemented in forms such as an a-si TFT, a low temperature poly silicon (LTPS) TFT, an organic TFT (OTFT), or any other known TFT structure. In one or more examples, a backlight unit, etc. may also be included.

According to one or more embodiments, the display 110 may include a capacitive type touch screen. Furthermore, according to one or more embodiments, on the front surface of the display 110, a touch film, a touch sheet, a touch pad, etc. may be included, and a touch sensor detecting a touch operation may be arranged, and implemented to detect various types of touch inputs. For example, the display 110 may detect various types of touch inputs such as a touch input by a user finger, a touch input by an input device such as a stylus pen, a touch input by a specific electrostatic substance, etc. Furthermore, according to one or more embodiments, the display 110 may be implemented as a flat display, a curved display, a flexible display that can be folded and/or rolled, etc. A touch input by a finger may also be one of various finger touch types such as a partial thumb, entire thumb, partial finger, entire finger, or any other finger touch type known to one of ordinary skill in the art.

The memory 120 may store data necessary for various embodiments. The memory 120 may be implemented in a form of a memory embedded in the electronic apparatus 100, or in a form of a memory that can be attached to or detached from the electronic apparatus 100, according to the usage of stored data. For example, in the case of data for operating the electronic apparatus 100, the data may be stored in a memory embedded in the electronic apparatus 100, and in the case of data for an extended function of the electronic apparatus 100, the data may be stored in a memory that can be attached to or detached from the electronic apparatus 100. In one or more examples, in the case of a memory embedded in the electronic apparatus 100, the memory may be implemented as at least one of a volatile memory (e.g., a dynamic RAM (DRAM), a static RAM (SRAM), or a synchronous dynamic RAM (SDRAM), etc.) or a non-volatile memory (e.g., an one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash, etc.), a hard drive, or a solid state drive (SSD)). In one or more examples, in the case of a memory that can be attached to or detached from the electronic apparatus, the memory may be implemented in forms such as a memory card (e.g., compact flash (CF), secure digital (SD), micro secure digital (Micro-SD), mini secure digital (Mini-SD), extreme digital (xD), a multimedia card (MMC), etc.), an external memory that is connectable to a USB port (e.g., a USB memory), etc.

The at least one processor 130 controls the overall operations of the electronic apparatus 100. Specifically, the at least one processor 130 may be connected to each component of the electronic apparatus 100, and control the overall operations of the electronic apparatus 100. For example, the at least one processor 130 may be electronically connected with the display 110 and the memory 120, and control the overall operations of the electronic apparatus 100. The processor 130 may consist of one or a plurality of processors.

The at least one processor 130 may perform the operations of the electronic apparatus 100 according to various embodiments by executing at least one instruction stored in the memory 120.

In one or more examples, functions related to artificial intelligence according to the disclosure are operated through the processor and the memory of the electronic apparatus.

The at least one processor 130 may consist of one or a plurality of processors. Here, the one or plurality of processors may include at least one of a central processing unit (CPU), a graphic processing unit (GPU), or a neural processing unit (NPU). However, as understood by one of ordinary skill in the art, the embodiments are not limited to these processors, and the embodiments may incorporate any suitable processor known to one of ordinary skill in the art.

A CPU may be a generic-purpose processor that can perform not only general operations but also artificial intelligence operations, and it can effectively execute a complex program through a multilayer cache structure. A CPU is advantageous for a serial processing method that enables a systemic linking between the previous calculation result and the next calculation result through sequential calculations. In one or more examples, a generic-purpose processor is not limited to the aforementioned examples excluding cases in which it is specified as the aforementioned CPU.

A GPU is a processor for mass operations such as a floating point operation used for graphic processing, etc. The GPU may perform mass operations in parallel by massively integrating cores. In particular, a GPU may be advantageous for a parallel processing method such as a convolution operation, etc. compared to a CPU. Also, a GPU may be used as a co-processor for supplementing the function of a CPU. Meanwhile, a processor for mass operations is not limited to the aforementioned examples excluding cases in which it is specified as the aforementioned GPU.

An NPU is a processor specialized for artificial intelligence operations using an artificial neural network. The NPU may implement each layer constituting an artificial neural network as hardware (e.g., silicon). In one or more examples, the NPU may be designed to be specialized according to the required specification of a company. Therefore, the NPU may have a lower degree of freedom compared to a CPU or a GPU, but can effectively process an artificial intelligence operation required by the company. In one or more examples, as a processor specialized for artificial intelligence operations, an NPU may be implemented in various forms such as a tensor processing unit (TPU), an intelligence processing unit (IPU), a vision processing unit (VPU), etc. In one or more examples, an artificial intelligence processor is not limited to the aforementioned examples excluding cases in which it is specified as the aforementioned NPU.

In one or more examples, the at least one processor 130 may be implemented as a system on chip (SoC). In one or more examples, in the SoC, the memory 120, and a network interface such as a bus for data communication between the processor 130 and the memory 120, etc. may be further included other than the at least one processor 130.

In case a plurality of processors are included in the system on chip (SoC) included in the electronic apparatus 100, the electronic apparatus 100 may perform an operation related to artificial intelligence (e.g., an operation related to learning or inference of the artificial intelligence model) by using some processors among the plurality of processors. For example, the electronic apparatus 100 may perform an operation related to artificial intelligence by using at least one of a GPU, an NPU, a VPU, a TPU, or a hardware accelerator specified for artificial intelligence operations such as a convolution operation, a matrix product operation, etc. among the plurality of processors. However, this is merely an example, and the electronic apparatus 100 may process an operation related to artificial intelligence by using a generic-purpose processor such as a CPU, etc.

In one or more examples, the electronic apparatus 100 may perform an operation for a function related to artificial intelligence by using a multicore (e.g., a dual core, a quad core, etc.) included in one processor. In particular, the electronic apparatus 100 may perform artificial intelligence operations such as a convolution operation, a matrix product operation, etc. in parallel by using the multicore included in the processor.

The at least one processor 130 may perform control such that input data is processed according to pre-defined operation rules or an artificial intelligence model stored in the memory 120. The pre-defined operation rules or the artificial intelligence model may be characterized in that performance of the artificial intelligence model is improved through learning.

In one or more examples, improving through learning means that predefined operation rules or an artificial intelligence model having desired characteristics are made by applying a learning algorithm to a plurality of learning data. Such learning may be performed in an apparatus itself in which artificial intelligence is performed according to the disclosure, or may be performed through a separate server/system.

An artificial intelligence model may comprise of a plurality of neural network layers. At least one layer has at least one weight value, and performs an operation of the layer through the operation result of the previous layer and at least one defined operation. The neural network may be a convolution neural network (CNN), a recurrent neural network (RNN), a deep neural network (DNN), a restricted Boltzmann Machine (RBM), a deep belief network (DBN), a bidirectional recurrent deep neural network (BRDNN), deep Q-networks, and a transformer, or any other suitable neural network known to one of ordinary skill in the art.

A learning algorithm may be a method of training a specific subject device (e.g., a robot) by using a plurality of learning data and thereby making the specific subject device make a decision or make prediction by itself. As examples of learning algorithms, there are supervised learning, unsupervised learning, semi-supervised learning, reinforcement learning, or any other suitable learning algorithm known to one of ordinary skill in the art. Hereinafter, the at least one processor 130 will be referred to as the processor 130, for the convenience of explanation.

Figure 2B:
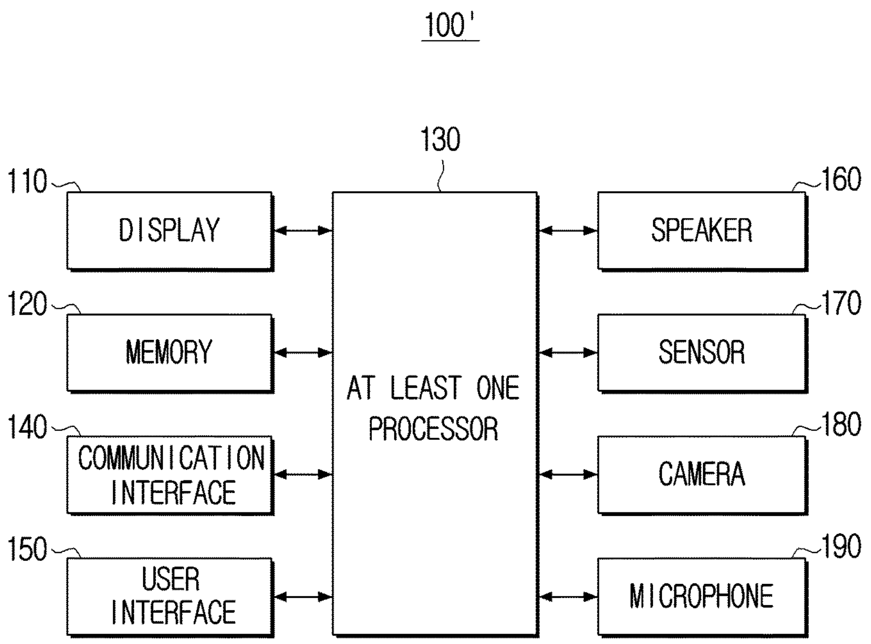
FIG. 2B is a block diagram illustrating a detailed configuration of an electronic apparatus according to one or more embodiments.

FIG. 2B is a block diagram illustrating a detailed configuration of an electronic apparatus according to one or more embodiments.

According to FIG. 2B, the electronic apparatus 100' may include a display 110, a memory 120, at least one processor 130, a communication interface 140, a user interface 150, a speaker 160, a sensor 170, a camera 180, and a microphone 190. Among the components illustrated in FIG. 2B, regarding components that overlap with the components illustrated in FIG. 2A, detailed explanation will be omitted.

The communication interface 140 may be implemented as various interfaces according to implementation examples of the electronic apparatus 100'. For example, the communication interface 140 may perform communication with an external apparatus, an external storage medium (e.g., a USB memory), an external server (e.g., a webhard), etc. through communication methods such as Bluetooth, AP-based Wi-Fi (Wi-Fi, a wireless LAN network), Zigbee, a wired/wireless local area network (LAN), a wide area network (WAN), an Ethernet, the IEEE 1394, a high-definition multimedia interface (HDMI), a universal serial bus (USB), a mobile high-definition link (MHL), the Audio Engineering Society/European Broadcasting Union (AES/EBU), Optical, Coaxial, etc. According to one or more embodiments, the communication interface 140 may perform communication with a remote control apparatus and/or a user terminal having a remote control function.

In one or more examples, the user interface 150 may be implemented as an apparatus such as a button, a touch pad, a mouse, and a keyboard, or implemented as a touch screen that can perform both the aforementioned display function and a manipulation input function, etc.

In one or more examples, the speaker 160 may be a component that outputs not only various kinds of audio data but also various kinds of notification sounds or voice messages, etc. The processor 130 may control the speaker 160 to output information corresponding to UI screens according to various embodiments of the disclosure or various kinds of notifications in audio forms.

In one or more examples, the sensor 170 may include various types of sensors such as a touch sensor, a proximity sensor, an acceleration sensor, a geomagnetic sensor, a gyro sensor, a pressure sensor, a position sensor, an illumination sensor, etc.

In one or more examples, the camera 180 may be turned on according to a predetermined event and perform photographing. The camera 180 may convert the photographed image into an electronic signal, and generate image data based on the converted signal. For example, a subject may be converted into an electronic image signal through a semiconductor optical element (a charge coupled device (CCD)), and the image signal converted as such may be amplified and converted into a digital signal, and then go through signal processing.

In one or more examples, the microphone 190 is a component for receiving input of a user voice or other sounds, and converting them into audio data. According to one or more embodiments, the electronic apparatus 100' may receive a user voice input through an external apparatus through the communication interface 150.

Figure 3:
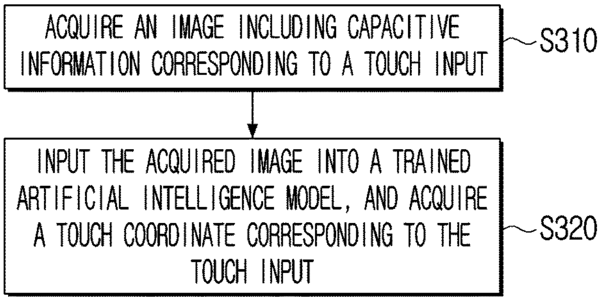
FIG. 3 is a diagram for illustrating a method of acquiring a touch coordinate according to one or more embodiments.

FIG. 3 is a diagram for illustrating a method of acquiring a touch coordinate according to one or more embodiments.

According to the embodiment illustrated in FIG. 3, the processor 130 may acquire an image including capacitive information corresponding to a touch input in operation S310. The image including capacitive information (e.g., referred to as a capacitive image hereinafter) may be an image including the strength of the capacitance corresponding to the entire areas or some areas of the display 110. In one or more examples, the strength of the capacitance may be expressed as a gray scale divided into a plurality of steps, but it is not necessarily limited thereto. In one or more examples, the strength of capacitance may be expressed as a natural number or an integer.

The processor 130 may input the acquired capacitive image into a trained artificial intelligence model, and acquire a touch coordinate corresponding to the touch input in operation S320. In one or more examples, the trained artificial intelligence model may be implemented as at least one of a convolution neural network (CNN) or a recurrent neural network (RNN), but is not limited thereto. A CNN may be a structure of extracting characteristics of data and identifying patterns of the characteristics, and may be divided into a characteristic extraction part in which a convolution layer and a pooling layer (or a max pooling layer) are repeatedly stacked, and a classification part in which a dense layer (or a full connected layer) is constituted and a softmax for classification is applied (a softmax layer) in the last output layer.

An RNN may be a type of artificial neural network specified for repetitive and sequential data learning. The RNN may have a characteristic that an inner circulation structure is included. An RNN may have characteristics that can reflect the past learning to the current learning through weights by using a circulation structure, and enable connection between the current learning and the past learning, and is subordinate to time.

According to one or more embodiments, the trained artificial intelligence model (e.g., referred to as the artificial intelligence model hereinafter) may be trained to output a touch coordinate corresponding to a touch input based on touch state information and touch type information identified from a capacitive image. In one or more examples, the touch state information may correspond to a condition of the touch screen at a time a touch input is received such as a wet state and a dry state. The touch state information may be identified based on at least one of the state of the touch screen or the state of the touch finger. The touch type information may include at least one of a first type of a finger touch/a non-finger touch, a second type of an entire finger touch/a partial finger touch, or a third type of a thumb touch/another finger touch.

Figure 4:
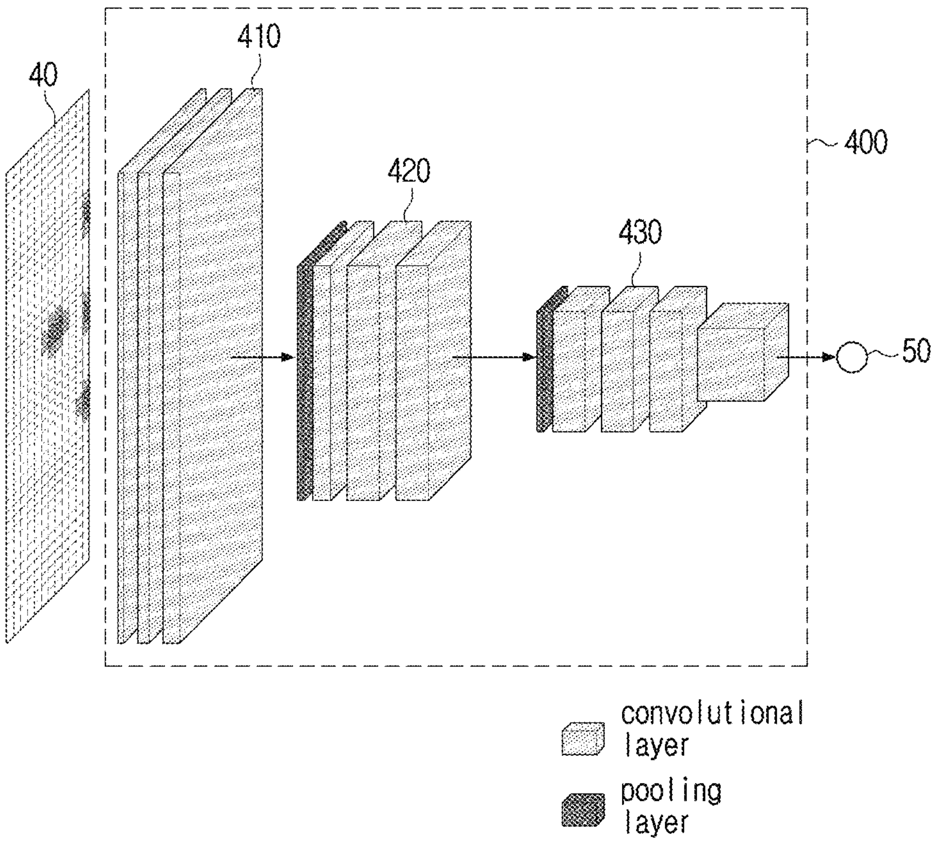
FIG. 4 is a diagram illustrating a configuration of an artificial intelligence model according to one or more embodiments.

FIG. 4 is a diagram illustrating a configuration of an artificial intelligence model according to one or more embodiments.

According to one or more embodiments, the artificial intelligence model may be implemented as a CNN as illustrated in FIG. 4.

According to FIG. 4, the CNN may include a first layer block 410, a second layer block 420, and a third layer block 430. Each layer block 410, 420, 430 may include a plurality of convolution layers. In one or more examples, the second layer block 420 and the third layer block 430 may include a pooling layer. In one or more examples, at least one of each layer block 410, 420, 430 may further include a dense layer. A convolution layer is a process of processing a given image as a convolution product and activating it by using an activation function, a pooling layer is a process of collecting results processed as a convolution product per predefined unit and reinforcing the characteristics, and a dense layer may perform a role of vectorizing the result of the previous step and connecting between a result to be ultimately output with a neural network.

According to one or more embodiments, the first layer block 410 may be trained to output state information of the touch screen. For example, the first layer block 410 may be implemented as a classifier block trained to output a touch state classification of any one of a touch in a wet state or a touch in a dry state.

In one or more examples, the second layer block 420 may be trained to output touch type information. For example, the second layer block 430 may be implemented as a classifier block trained to output a first type classification of a finger touch/a non-finger touch, a second type classification of an entire finger touch/a partial finger touch, or a third type classification of a thumb touch/another finger touch.

In addition, the third layer block 430 may be trained to output a touch coordinate.

As illustrated in FIG. 4, an output of the first layer block 410 may be provided to the second layer block 420, and an output of the second layer block 420 may be provided to the third layer block 430. In one or more examples, the first layer block 410 and the second layer block 420 may be parallel to each other where the output of the first layer block 410 and the output of the second layer block 420 are provided to the third layer block 430.

According to one or more embodiments, if a capacitive image 40 is input into a CNN as in FIG. 4, a touch coordinate 50 may be output.

Figure 5:
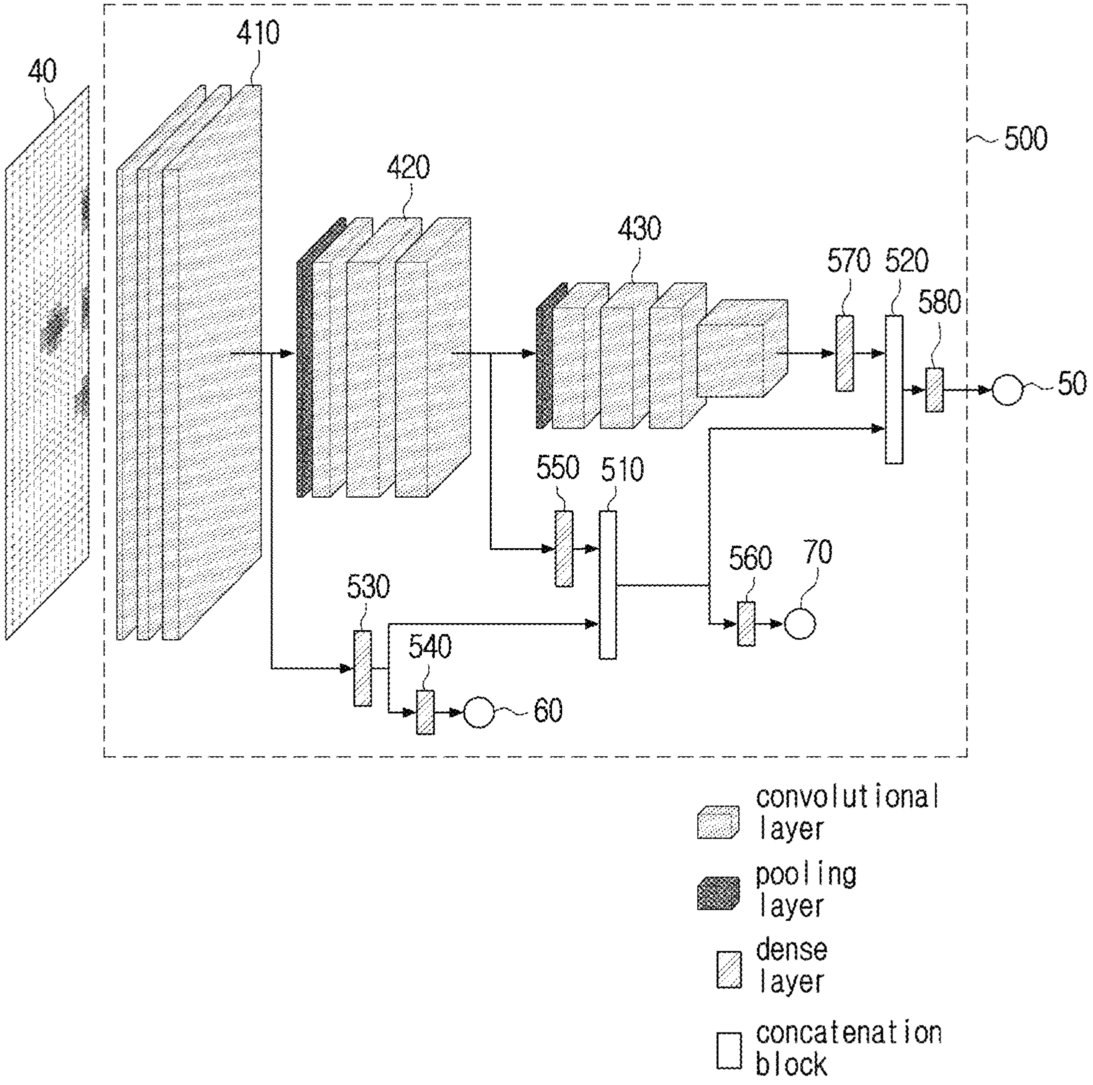
FIG. 5 is a diagram illustrating a configuration of an artificial intelligence model according to one or more embodiments.

FIG. 5 is a diagram illustrating a configuration of an artificial intelligence model according to one or more embodiments.

According to one or more embodiments, an artificial intelligence model may be implemented based on a CNN as illustrated in FIG. 4.

According to FIG. 5, the artificial intelligence model 500 may be configured to, if the capacitive image 40 is input, output a touch coordinate 50.

According to FIG. 5, the artificial intelligence model 500 may include the first layer block 410, the second layer block 420, and the third layer block 430. Each layer block 410, 420, 430 may include a plurality of convolution layers. In one or more examples, the second layer block 420 and the third layer block 430 may include a pooling layer. Each layer block 410, 420, 430 may further include a fully connected (FC) layer. As the operations of the first layer block 410, the second layer block 420, and the third layer block 430 are identical to those of the components illustrated in FIG. 4, detailed explanation will be omitted.

The artificial intelligence model 500 illustrate in FIG. 5 may include a first operation block 510 and a second operation block 520 compared to the artificial intelligence model 400 illustrated in FIG. 4. The first operation block 510 may concatenate an output of the first layer block 410 and an output of the second layer block 420. For example, the first operation block 510 may perform a concatenation operation for an output of the first layer block 410 and an output of the second layer block 420. The second operation block 530 may concatenate an output of the third layer block 430 and an output of the first operation block 510. For example, the second operation block 530 may perform a concatenation operation for an output of the third layer block 430 and an output of the first operation block 510.

According to the artificial intelligence model 500 illustrated in FIG. 5, the touch coordinate 50 corresponding to a touch input may be acquired based on an output of the second operation block 530.

According to FIG. 5, an output of the first layer block 410 may be provided to the first operation block 510 through the dense layer 530, and an output of the second layer block 420 may be provided to the first operation block 510 through the dense layer 550. In one or more examples, an output of the first operation block 510 may be provided to the second operation block 520, and an output of the third layer block 430 may be provided to the second operation block 520 through the dense layer 570. In one or more examples, the touch coordinate 50 may be output through the dense layer 580 connected to an output of the second operation block 520.

In one or more examples, the dense layers may connect an input and an output, and may include a weight respectively connecting an input and an output. According to one or more embodiments, a hidden layer may be used before an output layer of a dense layer.

In one or more examples, an output acquired through the dense layer 540 of the first layer block 410, for example, the touch state information 60, and an output acquired through the dense layer 560 of the first operation block 510, for example, the touch type information 70, may be applied in various forms. For example, the output of the dense layers may be used in determining a user's touch habit, or providing a user notification. In one or more examples, the dense layer 540 of the first layer block 410 may be identical to the dense layer 530, but the dense layers were illustrated in different reference numerals for clarifying each connective relation.

As a result of the above-described embodiments, a dense vector through a dense layer may be concatenated with a representation vector that passed through each layer block. Therefore, if embedding from the previous classifier block, for example, a dense vector is used, the precision of the next classifier block may be significantly improved.

According to one or more embodiments, the first layer block 410 may be trained to output the touch state information. In one or more examples, the second layer block 420 may be trained to output the touch type information. In addition, the third layer block 430 may be trained to output a touch coordinate. As illustrated in FIG. 4, an output of the first layer block 410 may be provided to the second layer block 420, and an output of the second layer block 420 may be provided to the third layer block 430.

According to one or more embodiments, the processor 130 may pre-process a capacitive image to generate a pre-processed image, and input the generated pre-processed image into the trained artificial intelligence model. In one or more examples, the pre-processing may include at least one processing among noise filtering processing, segmentation processing, or direction rotation processing.

Figure 6:
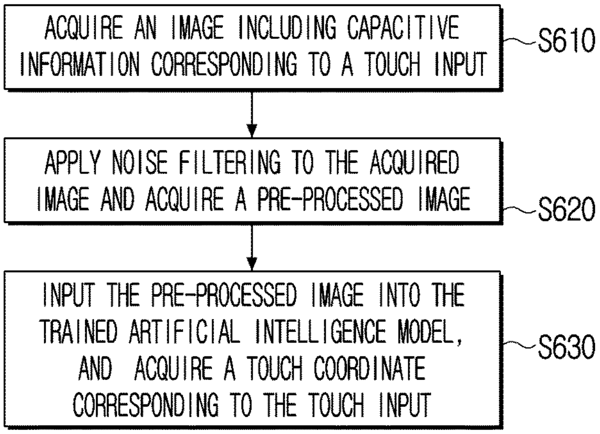
FIG. 6 is a diagram for illustrating a method of acquiring a touch coordinate according to one or more embodiments.

FIG. 6 is a diagram for illustrating a method of acquiring a touch coordinate according to one or more embodiments.

According to the embodiment illustrated in FIG. 6, the processor 130 may acquire an image including capacitive information (e.g., referred to as a capacitive image hereinafter) corresponding to a touch input in operation S610.

The processor 130 may acquire/generate a pre-processed image by applying noise filtering to the acquired capacitive image in operation S620. In this case, the conventional various noise filtering methods may be applied.

The processor 130 may input the pre-processed image into the trained artificial intelligence model, and acquire a touch coordinate corresponding to the touch input in operation S630. For example, the trained artificial intelligence model may be implemented as illustrated in FIG. 4 or FIG. 5.

Figure 7A:
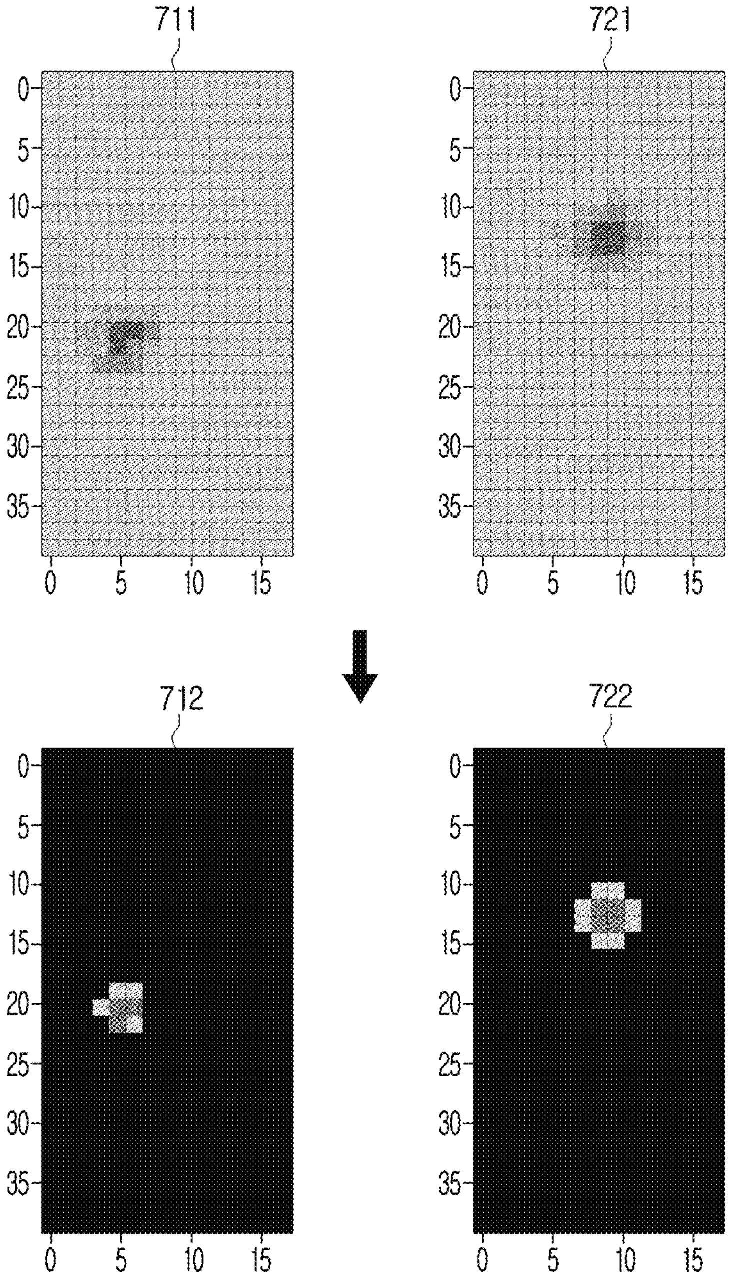
FIG. 7A and FIG. 7B are diagrams for illustrating a method of noise filtering of a capacitive image according to one or more embodiments.
Figure 7B:
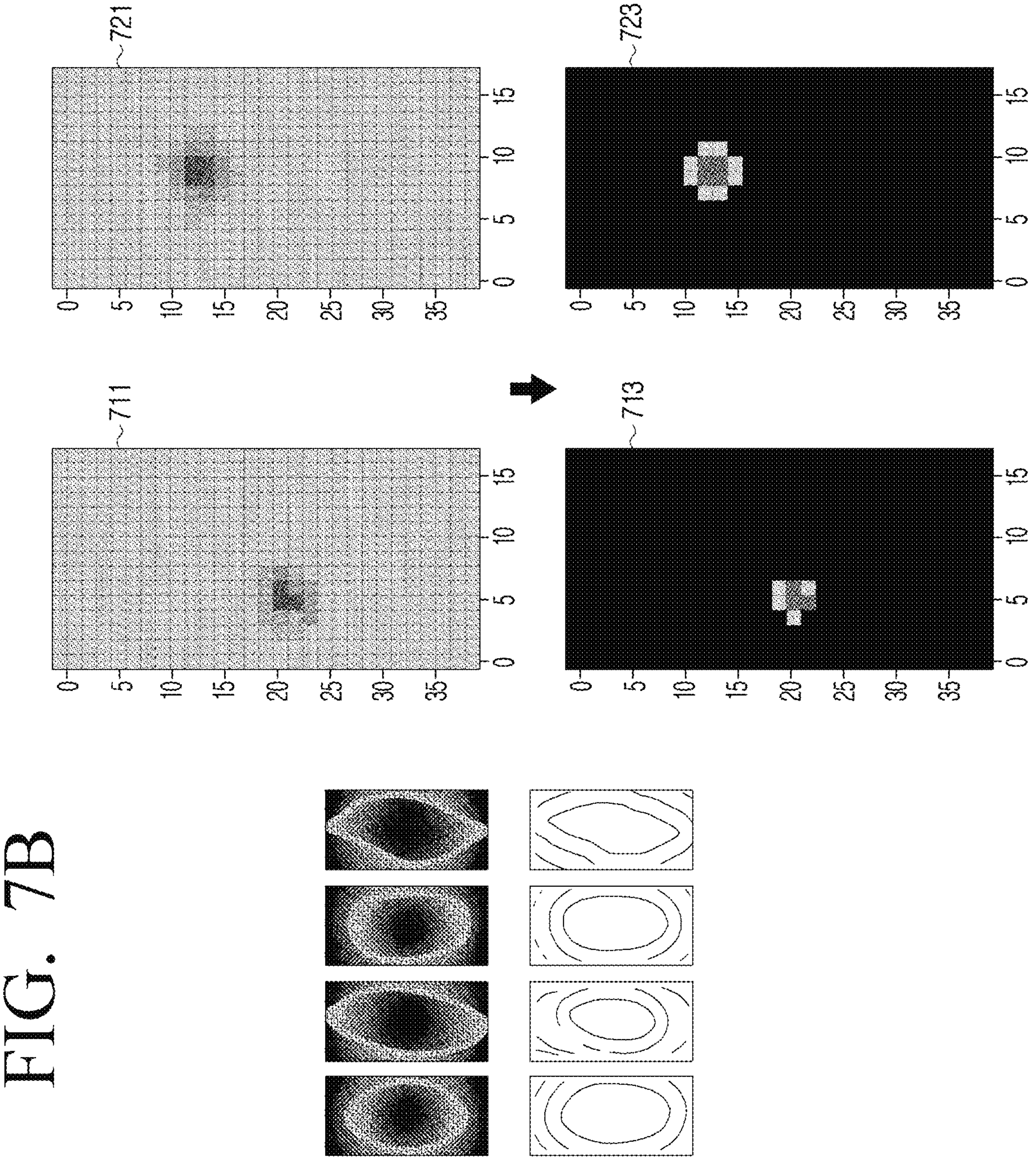

FIG. 7A and FIG. 7B are diagrams for illustrating a method of noise filtering of a capacitive image according to one or more embodiments.

According to one or more embodiments, if noise filtering for capacitive images 711, 712 is applied as illustrated in FIG. 7A, capacitive images 712, 722 from which noises were removed may be acquired. For example, noise filtering may be performed using at least one filter among a mean filter, a median filter, an order statistics filter, and an adaptive filter. In one or more examples, the types of noises may be various, and noise filtering methods applied may vary according to the types of noises.

In one or more examples, noises generated by touches may have the same periodical structure (pattern). Accordingly, as illustrated in FIG. 7B, 2D Fourier transform and additional image restoration may be performed for the capacitive images 711, 712, and capacitive images 713, 723 from which noises were removed may be acquired. The 2D Fourier transform regards a change of the brightness of pixels as a waveform or a signal while following an image in the x axis or the y axis direction, and applying frequency analysis, and the strength of each frequency component acquired through Fourier transform may be referred to as a spectrum. In one or more examples, this spectrum may also be expressed as an image. For example, as illustrated in FIG. 7B, the capacitive images 711, 712 may be converted into frequency domain images, and then noises may be removed from the frequency domain images. For example, in a spectrum image indicating a frequency domain, an improved image can be acquired by removing a part corresponding to a noise part (e.g., a high frequency domain or a low frequency domain).

Figure 8:
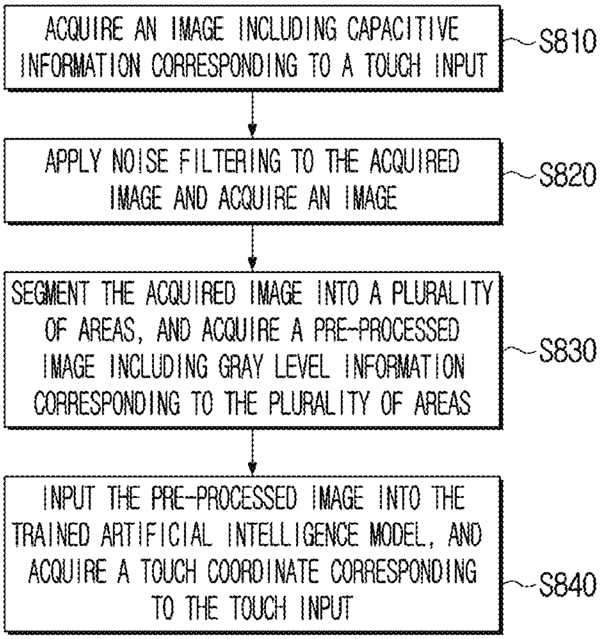
FIG. 8 and FIG. 9 are diagrams for illustrating a method of acquiring a touch coordinate according to one or more embodiments.
Figure 9:
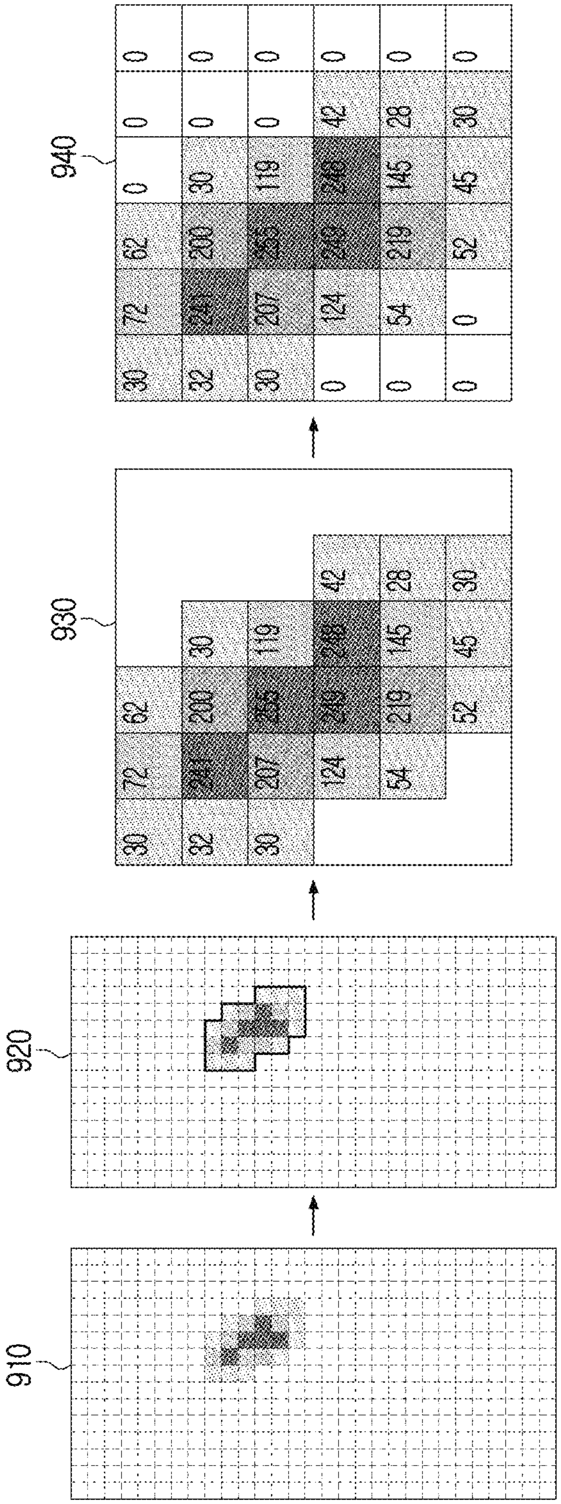

FIG. 8 and FIG. 9 are diagrams for illustrating a method of acquiring a touch coordinate according to one or more embodiments.

According to the embodiments illustrated in FIG. 8, the processor 130 may acquire an image including capacitive information (e.g., referred to as a capacitive image hereinafter) corresponding to a touch input in operation S810.

Subsequently, the processor 130 may acquire an image by applying noise filtering to the acquired capacitive image in operation S820. In this case, various noise filtering methods as described in FIG. 6, FIG. 7A, and FIG. 7B may be applied.

Subsequently, the processor 130 may segment the image acquired at the operation S820 into a plurality of areas, and acquire a pre-processed image in operation S830. For example, as illustrated in FIG. 9, the processor 130 may segment (920) an area in which the capacitance value is greater than or equal to a threshold value in the capacitive image 910, and acquire pre-processed images 930, 940 including capacitance values for each segmented area. According to one or more embodiments, methods such as area expansion from a pixel having the biggest value (Pal, N. R., & Pal, S. K. (1993). A review on image segmentation techniques. Pattern recognition, 26(9), 1277-1294), and binarization using Otsu thresholding (Otsu, N. (1979). A threshold selection method from gray-level histograms. IEEE transactions on systems, man, and cybernetics, 9(1), 62-66), etc. may be used. As understood by one of ordinary skill in the art, any suitable method for segmentation of a gray scale image may be used in the operation S830.

The processor 130 may input the pre-processed image into the trained artificial intelligence model, and acquire a touch coordinate corresponding to the touch input in operation S840. For example, the trained artificial intelligence model may be implemented as illustrated in FIG. 4 or FIG. 5.

Figure 10:
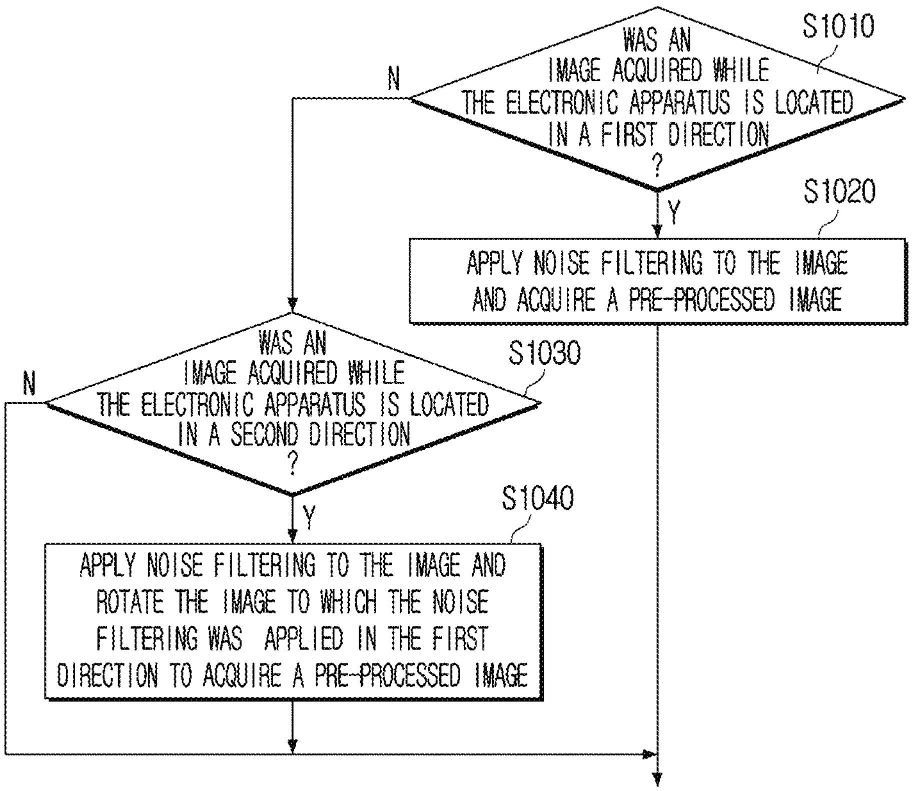
FIG. 10, FIG. 11A, and FIG. 11B are diagrams for illustrating a method of acquiring a touch coordinate according to one or more embodiments.
Figure 11A:
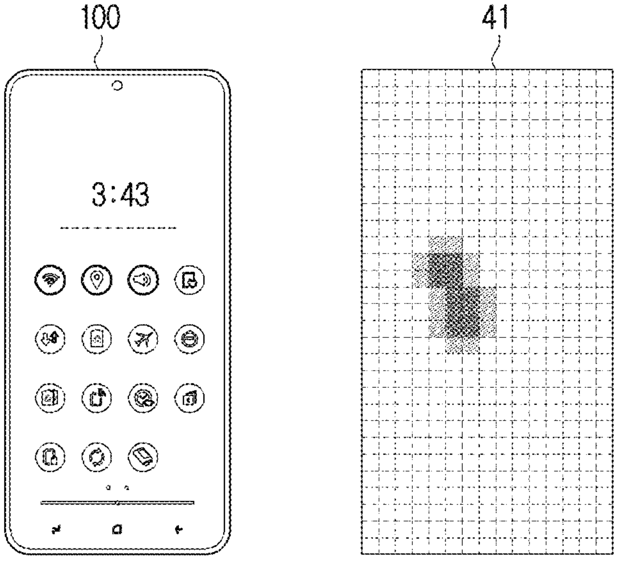
Figure 11B:
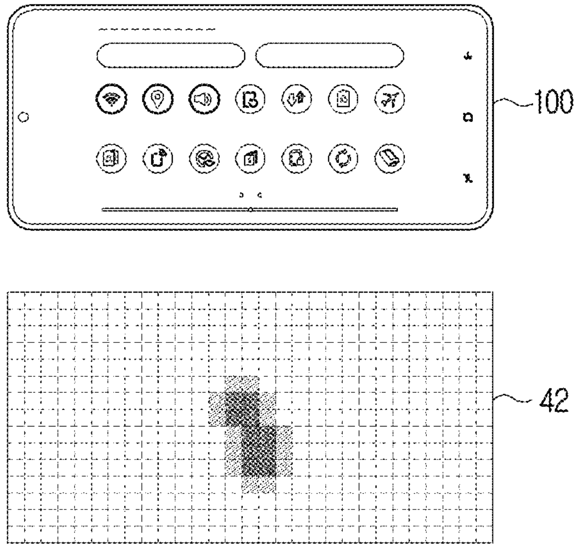

FIG. 10, FIG. 11A, and FIG. 11B are diagrams for illustrating a method of acquiring a touch coordinate according to one or more embodiments.

According to the embodiment illustrated in FIG. 10, if a capacitive image is acquired while the electronic apparatus 100 is located in a first direction in operation S1010:Y, the processor 130 may apply noise filtering to the capacitive image and acquire/generate a pre-processed image in operation S1020. In one or more examples, the first direction may be a vertical direction (or a portrait orientation). For example, as illustrated in FIG. 11A, while the electronic apparatus 100 implemented as a smartphone is located in the vertical direction (e.g., a state in which the user is holding the electronic apparatus 100 in the vertical direction), if a capacitive image 41 in the vertical direction is acquired according to an input touch, direction rotation of the capacitive image 41 is not needed since the content provided on the screen (e.g., an application icon) is in the same direction as the capacitive image 41.

In contrast, if a capacitive image is acquired while the electronic apparatus 100 is located in a second direction different from the first direction in operation S1030:Y, the processor 130 may apply noise filtering to the capacitive image and rotate the image to which the noise filtering was applied in the first direction, e.g., the same direction as the direction of the content (e.g., an application icon) to acquire a pre-processed image in operation S1040. In one or more examples, the second direction may be a horizontal direction (or a landscape orientation). For example, as illustrated in FIG. 11B, while the electronic apparatus 100 implemented as a smartphone is located in the horizontal direction (e.g., a state in which the user is holding the electronic apparatus 100 in the horizontal direction), if a capacitive image 42 in the horizontal direction is acquired according to an input touch, direction rotation of the capacitive image 42 is needed since the content provided on the screen (e.g., an application icon) is in a different direction from the capacitive image 42.

In one or more examples, depending on needs, the segmentation described in FIG. 8 and FIG. 9 may be applied as a part of pre-processing.

Figure 12:
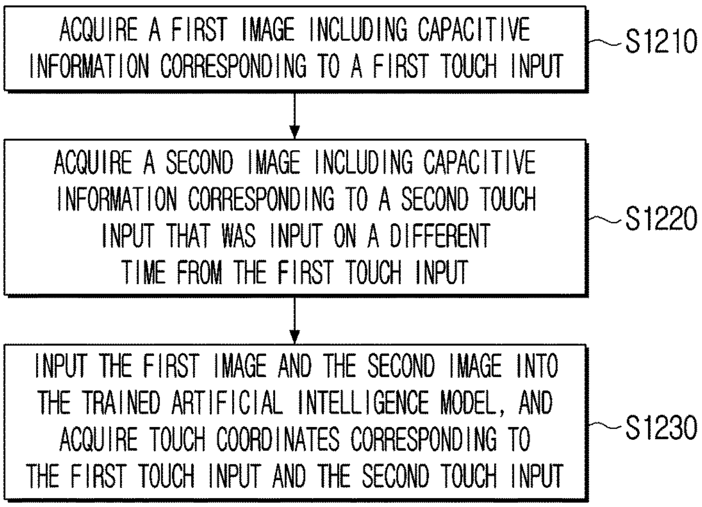
FIG. 12 is a diagram for illustrating a method of acquiring a touch coordinate according to one or more embodiments.

FIG. 12 is a diagram for illustrating a method of acquiring a touch coordinate according to one or more embodiments.

According to one or more embodiments, the processor 130 may acquire a plurality of images including capacitive information corresponding to a plurality of touch inputs that were input on different times, e.g., a plurality of capacitive images, and input the plurality of capacitive images into the trained artificial intelligence model (e.g., referred to as the artificial intelligence model hereinafter) to acquire touch coordinates corresponding to the plurality of touch inputs.

According to the embodiment illustrated in FIG. 12, the processor 130 may acquire a first image including capacitive information corresponding to a first touch input, e.g., a first capacitive image in operation S1210.

Subsequently, the processor 130 may acquire a second image including capacitive information corresponding to a second touch input that was input on a different time from the first touch input, e.g., a second capacitive image in operation S1220.

Afterwards, the processor 130 may input the first capacitive image and the second capacitive image into the trained artificial intelligence model, and acquire touch coordinates corresponding to each of the first touch input and the second touch input in operation S1230.

According to one or more embodiments, the artificial intelligence model may include not only a first layer block, a second layer block, and a third layer block, but also a first middle layer located between the first layer block and the second layer block, and a second middle layer located between the second layer block and the third layer block. For example, the first layer block, the second layer block, and the third layer block may be implemented as a convolution neural network (CNN) as illustrated in FIG. 4, and the first middle layer and the second middle layer may be implemented as a recurrent neural network (RNN). The RNN may apply the past learning to the current learning through weights by using a circulation structure, and enable connection between the current learning and the past learning, and is subordinate to time. However, the disclosure is not limited thereto, and the first middle layer and the second middle layer can be implemented as different time-dependent layers such as a biLSTM or a biGRU having an attention mechanism, or as encoders having an attention layer (e.g., transformer architectures).

According to one or more embodiments, the artificial intelligence model may be configured to, if a plurality of images are input into the first layer block, input an output of the first layer block into the first middle layer and input an output of the first middle layer into the second layer block, and input an output of the second layer block into the second middle layer and input an output of the second middle layer into the third layer block.

In one or more examples, the artificial intelligence model may further include a third operation block concatenating an output of the first middle layer and an output of the second layer block, and a fourth operation block concatenating an output of the third layer block and an output of the second middle layer. In this case, a touch coordinate corresponding to a touch input may be acquired based on an operation of the fourth operation block.

Figure 13:
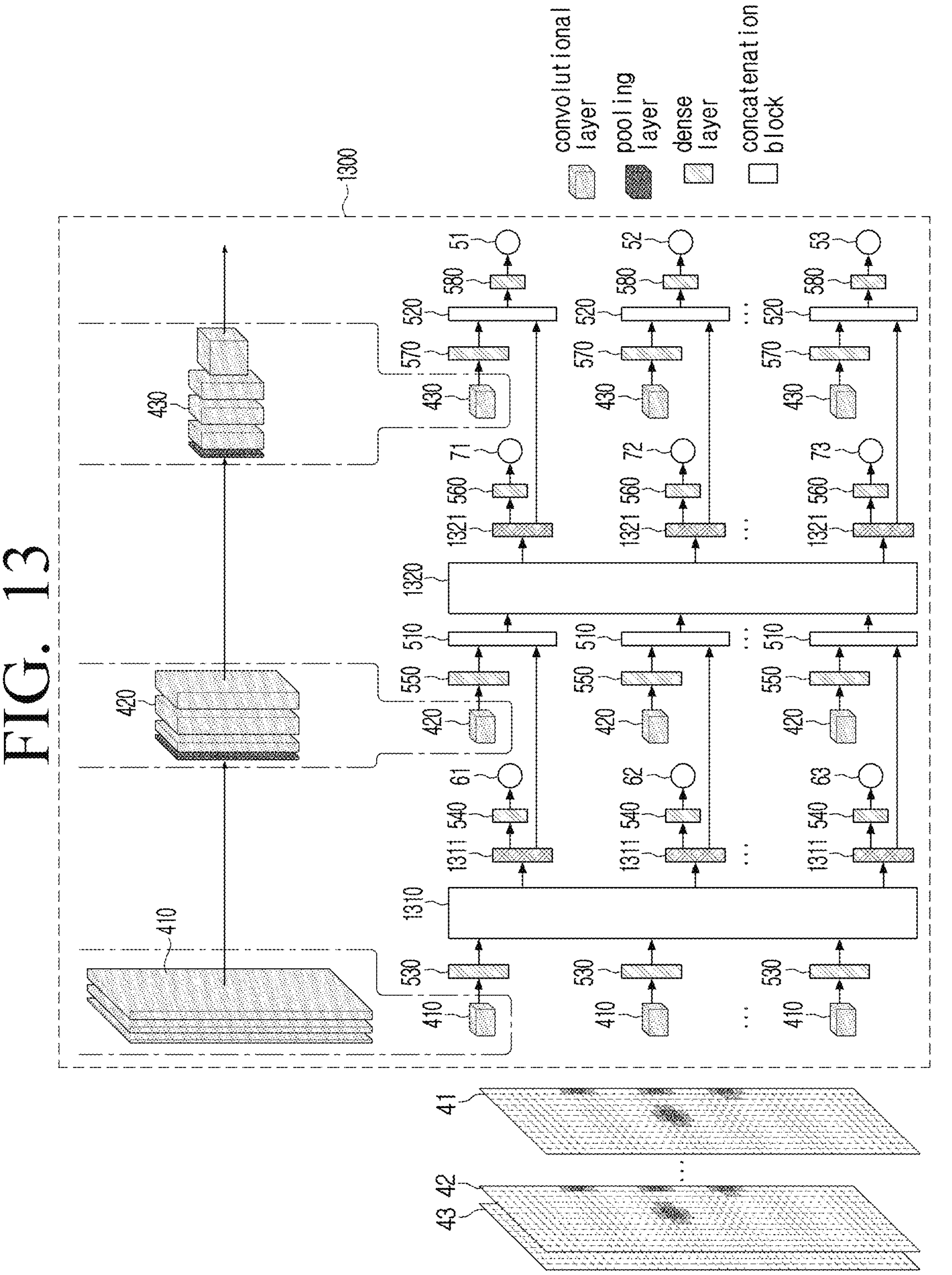
FIG. 13 is a diagram illustrating a configuration of an artificial intelligence model according to one or more embodiments.

FIG. 13 is a diagram illustrating a configuration of an artificial intelligence model according to one or more embodiments.

According to one or more embodiments, the artificial intelligence model may include a time-dependent feature block. For example, various kinds of information acquired through a capacitive image may be accumulated according to a time line by using a time-dependent feature block, and improve the precision of a touch input. For example, the precision regarding a move action, a hover touch action, etc. can be improved, and the precision regarding a touch down action can further be improved.

According to FIG. 13, the artificial intelligence model 1300 may include time-dependent feature blocks 1310, 1320 other than the components 410, 420, 430, 510, 520, 530, 540, 550, 560, 580 as illustrated in FIG. 5. In one or more examples, the time-dependent feature block 1310, 1320 may be implemented as RNN layers, but are not limited thereto. For example, the time-dependent feature blocks can be implemented as different time-dependent layers such as a biLSTM or a biGRU having an attention mechanism, or as encoders having an attention layer (e.g., transformer architectures). Hereinafter, it will be assumed that the time-dependent feature block 1310, 1320 are implemented as RNN layers for the convenience of explanation.

According to the artificial intelligence model 1300 illustrated in FIG. 13, if a plurality of capacitive images 41, 42, 43 acquired according to the time line are input, an output of the first layer block 410 may be provided to a first RNN layer 1310 through a dense layer 530 for each of the plurality of capacitive images 41, 42, 43. In one or more examples, for the convenience of explanation, the last output of the first RNN layer 1310 is illustrated as a separate RNN layer 1311.

An output of the first RNN layer 1310 may be provided to a first operation block 510 for each of the plurality of capacitive images 41, 42, 43, and an output of the second layer block 420 may be provided to the first operation block 510 through a dense layer 550.

In one or more examples, an output of the first operation block 510 may be provided to a second RNN layer 1320 for each of the plurality of capacitive images 41, 42, 43. Here, for the convenience of explanation, the last output of the second RNN layer 1320 was illustrated as a separate RNN layer 1312.

An output of the second RNN layer 1320 may be provided to a second operation block 520 for each of the plurality of capacitive images 41, 42, 43, and an output of the third layer block 430 may be provided to the second operation block 520 through a dense layer 570.

In one or more examples, touch coordinates 51, 52, 53 may be output through a dense layer 580 connected to an output of the second operation block 520 for each of the plurality of capacitive images 41, 42, 43.

In one or more examples, outputs acquired through the dense layer 540 of the first layer block 410 for each of the plurality of capacitive images 41, 42, 43, e.g., a plurality of touch state information 61, 62, 63, and outputs acquired through the dense layer 560 of the first operation block 510, e.g., a plurality of touch type information 71, 72, 73 may be applied in various forms. For example, this information may be used in determining a user's touch habit, or providing a user notification.

FIG. 14A, FIG. 14B, FIG. 15, FIG. 16, FIG. 17, FIG. 18, and FIG. 19 are diagrams for illustrating a use case according to one or more embodiments.

In FIG. 14A, FIG. 14B, FIG. 15, FIG. 16, FIG. 17, FIG. 18, and FIG. 19, a case in which the electronic apparatus 100 is a smartphone will be described.

Figure 14A:
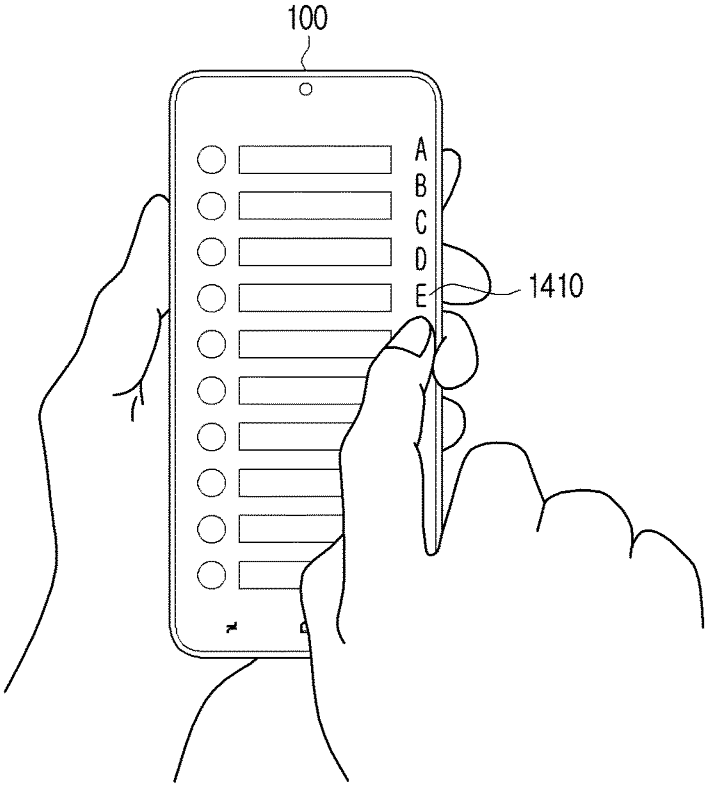
FIG. 14A, FIG. 14B, FIG. 14C, FIG. 15, FIG. 16, FIG. 17, FIG. 18, and FIG. 19 are diagrams for illustrating a use case according to one or more embodiments.
Figure 14B:
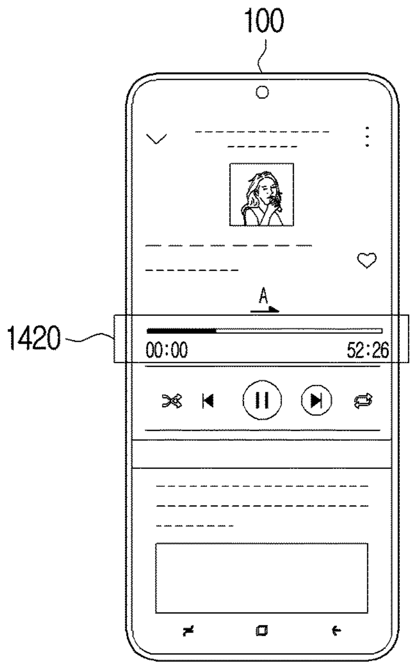
Figure 14C:
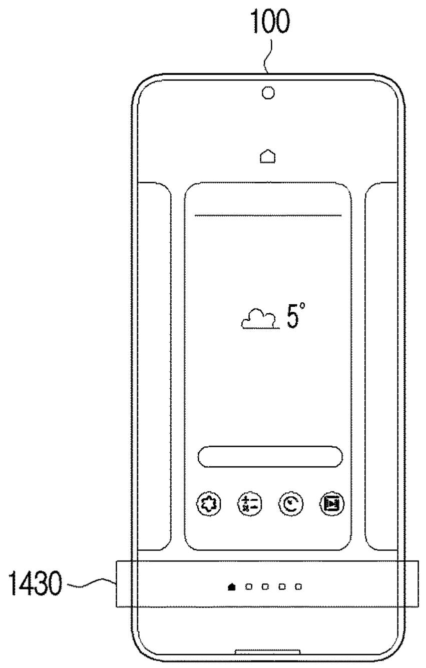

According to FIG. 14A to FIG. 14C, according to the size of the screen of the electronic apparatus 100, the size of an interactive content displayed on the screen (e.g., a small screen) may be small. For example, the sizes of the alphabet list 1410 for searching a contact list as illustrated in FIG. 14A, the play bar 1420 as illustrated in FIG. 14B, and the screen selection indicator 1430 as illustrated in FIG. 14C, etc. may be relatively small compared to other contents. In this case, the user should touch a correct area on the screen to acquire a desired result. However, there is a problem that it is difficult for a user with a fat finger to correctly touch a desired area. According to the embodiments of the present disclosure, problems that may occur due to an incorrect touch and a misclick, etc. can be prevented, and thus, a user's UX experience may be improved.

Figure 15:
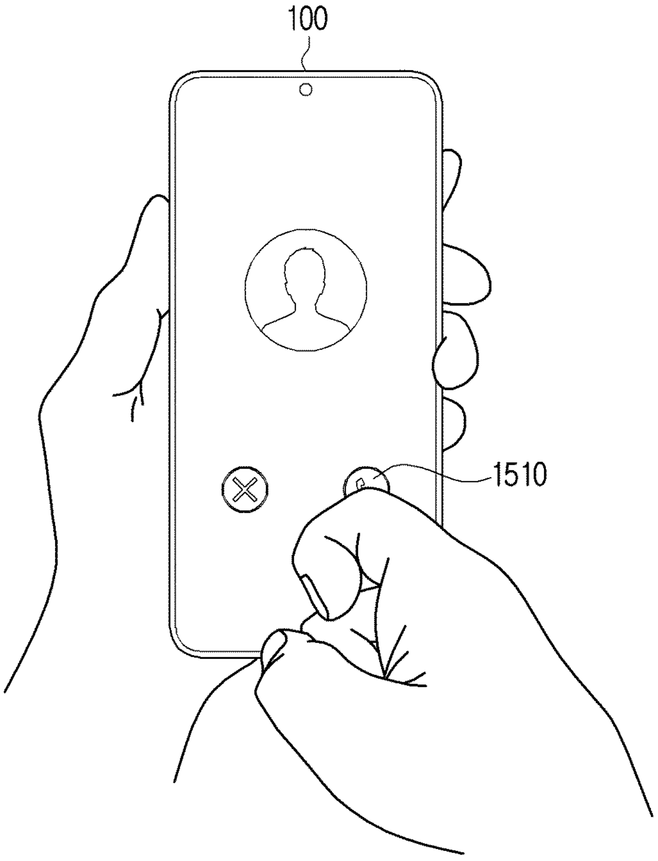

According to FIG. 15, there may be a case in which a user's touch type is not general. According to one or more embodiments, in case a user cannot tap the screen as usual, there may be a case in which the user touches an item 1510 by using a knuckle tap. For example, a user may touch the screen with a knuckle tap in case the user's hand is dirty, in case the user's finger is wet, etc. This is because, in the case of touching the screen with a dirty hand, it may lead to contamination of the display, potential damage to the display, etc., and the apparatus can be used more productively than a case of touching with a fingertip.

According to the disclosure, a correct touch location can be acquired in the case of a touch of an uncommon type as above.

Figure 16:
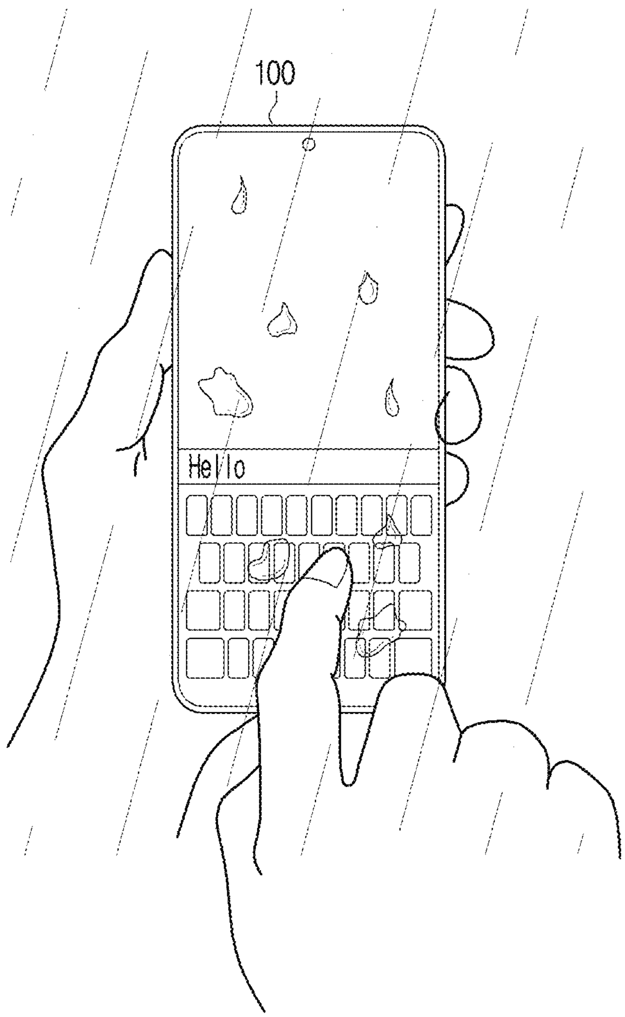

According to FIG. 16, a problem may occur in a touch input under a wet condition (e.g., a situation in which it is raining, a case of touching with a wet finger). Water may provide another channel for electricity and generate an incorrect touch (e.g., water between a finger and the screen increases a touch area and causes an irregular input), and in case the user does not interact with the apparatus, water may become a factor for 'ghost touches.' This type of wet condition may be particularly noticeable in a scenario of using a swipe input, a glide input, or other continuous inputs, etc.

According to the disclosure, a correct touch location can be acquired in a case in which water remains on a finger or it is raining.

Figure 17:
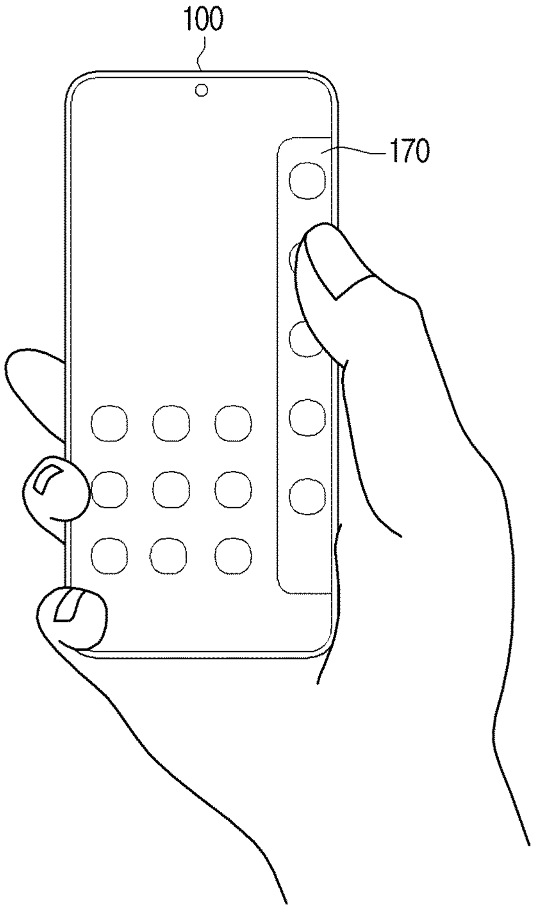

According to FIG. 17, a UI element 1710 on an edge of the screen (e.g., a menu located on an edge) may leave a more space for contents in the main area of the screen, and thus, usability of the apparatus can be extended. While a user is interacting on an edge of the screen, just a part of the user's finger covers the screen area, and thus, a margin area is generally needed between the edge of the screen and the UI element to acquire a correct input. As a result, the UI element gets to occupy a more space on the screen.

However, according to the disclosure, the interaction precision for the UI element located near an edge of the screen can be improved without adding a margin area.

Figure 18:
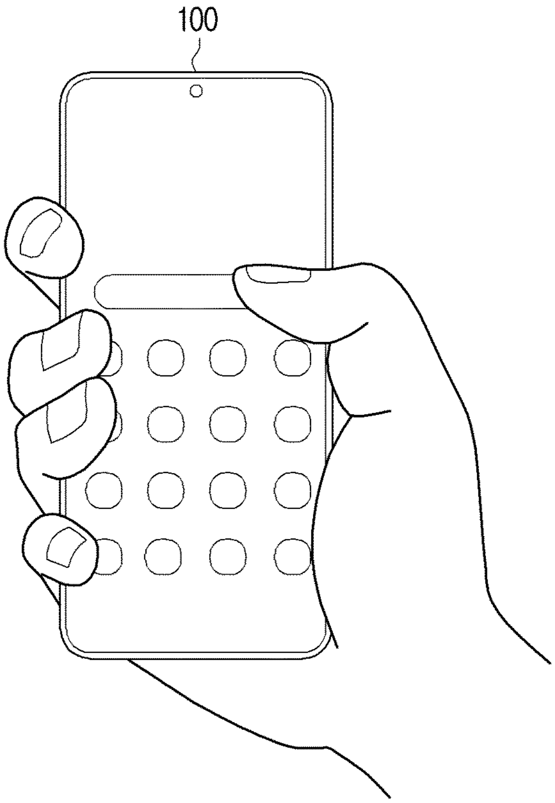

According to FIG. 18, a user may interact while holding the apparatus by using various hand postures. At the same time, in an interaction with the apparatus that the user is holding with one hand, the user may be interrupted by another object (e.g., a bag or a key). In this case, if the target UI element is located on the opposite of the finger, the user should drag the finger to the location, and a touch may be difficult on a relatively big screen. For example, a touch in this case may have a larger touch area compared to other cases of touch inputs, and thus input precision can be degraded.

However, according to the disclosure, even in case a user touches while holding the apparatus in one hand, interaction precision for a UI element can be improved.

Figure 19:
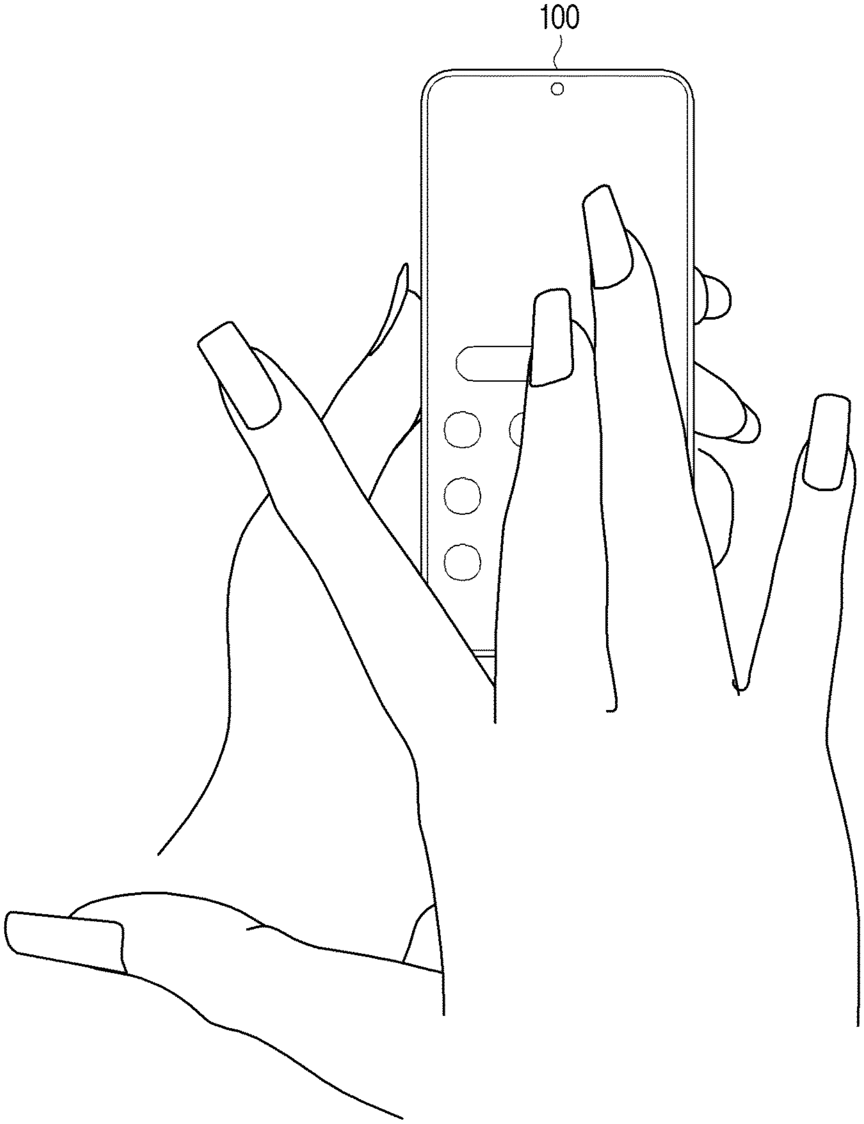

According to FIG. 19, the length of a user's fingernail may directly influence the angle by which the finger touches the screen. In the case of a long fingernail, the screen is touched with a finger pad providing a bigger contact surface than the fingertip, and input precision can be degraded. As a solution for improving the precision, a wearable accessory (e.g., a wearable finger stylus manufactured with a special conductive material, a nail stylus tip, etc.) may be used, but wearing of the accessory gets to cause inconvenience.

However, according to the disclosure, interaction precision of a user having a long fingernail can be improved without using a wearable accessory.

Figure 20A:
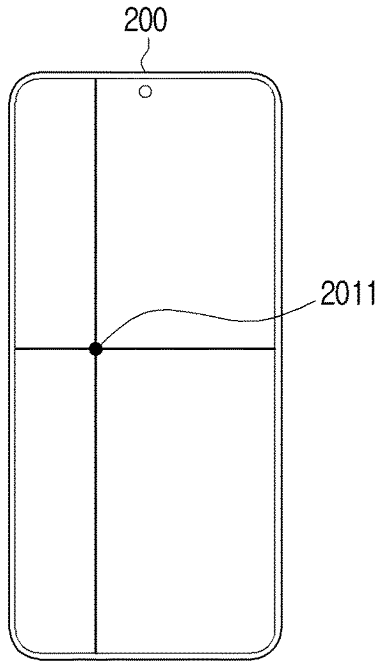
FIG. 20A to FIG. 20C are diagrams for illustrating a method of detecting infringement according to one or more embodiments.
Figure 20B:
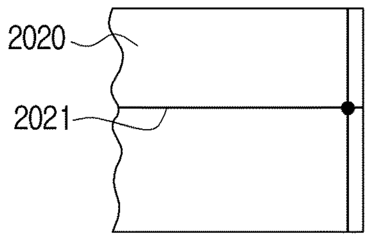
Figure 20C:
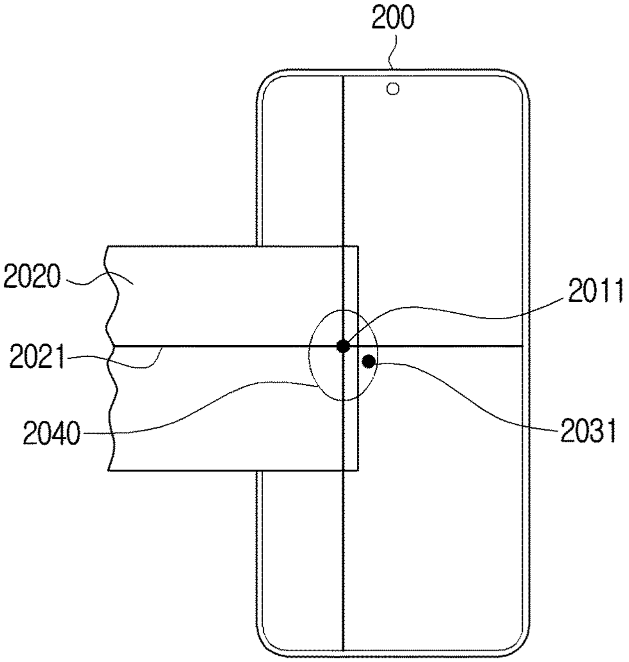

FIG. 20A to FIG. 20C are diagrams for illustrating a method of detecting infringement according to one or more embodiments.

According to FIG. 20A, a cross line may be displayed on a touch location 2011 of a subject apparatus 200, and a dielectric sheet 2020 of a thin dielectric material (e.g., plastic) that can separate the touch screen from a contact with a finger may be prepared as illustrated in FIG. 20B. In this case, on the dielectric sheet 2020, the same cross line 2021 should be displayed.

As illustrated in FIG. 20C, the subject apparatus 200 may be covered with the dielectric sheet 2020, and the cross line of the dielectric sheet 2020 may be made to coincide with the cross line displayed on the apparatus. In this case, the center of the cross line should be located with a margin, and thus, the screen can be partially touched with a finger when aiming the target touch location. If the target touch location 2011 and the detected touch location 2031 coincide, it may be determined that infringement regarding the suggested method has been established. In case the suggested method is not used, the detected touch location 2031 may be located in the geometric center of the screen area 2040 covered with a finger as illustrated in FIG. 20C.

According to the aforementioned various embodiments, precision of touch location detection can be improved without an additional sensor, and thus a user's UX experience can be improved while reducing the cost.

Meanwhile, the methods according to the aforementioned various embodiments of the disclosure may be implemented just with software upgrade, or hardware upgrade of conventional electronic apparatuses.

Also, the aforementioned various embodiments of the disclosure may be performed through an embedded server provided on an electronic apparatus, or an external server of an electronic apparatus.

Meanwhile, according to one or more embodiments of the disclosure, the aforementioned various embodiments may be implemented as software including instructions stored in machine-readable storage media, which can be read by machines (e.g., computers). The machines refer to apparatuses that call instructions stored in a storage medium, and can operate according to the called instructions, and the apparatuses may include an electronic apparatus according to the aforementioned embodiments (e.g., an electronic apparatus A). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to one or more embodiments of the disclosure, the methods according to the aforementioned various embodiments may be provided while being included in a computer program product. A computer program product refers to a product, and it can be traded between a seller and a buyer. A computer program product can be distributed in the form of a storage medium that is readable by machines (e.g., a compact disc read only memory (CD-ROM)), or distributed on-line through an application store (e.g., Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components according to the aforementioned various embodiments (e.g., a module or a program) may consist of a singular object or a plurality of objects. Also, among the aforementioned corresponding sub components, some sub components may be omitted, or other sub components may be further included in the various embodiments. Alternatively or additionally, some components (e.g., a module or a program) may be integrated as one object, and perform functions that were performed by each of the components before integration identically or in a similar manner. Further, operations performed by a module, a program, or other components according to the various embodiments may be executed sequentially, in parallel, repetitively, or heuristically. Or, at least some of the operations may be executed in a different order or omitted, or other operations may be added.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic apparatus comprising:

a display including a capacitive type touch screen;

a memory storing at least one instruction; and at least one processor configured to be connected with the display and the memory, and control the electronic apparatus, wherein the at least one processor is configured to, by executing the at least one instruction:

acquire an image including capacitive information corresponding to a touch input, apply noise filtering to the acquired image by converting the image to a frequency domain image and removing noise from the frequency domain image to acquire a pre-processed image, and input the pre-processed image into an artificial intelligence model configured to output a touch coordinate corresponding to a location of the touch input on the capacitive type touch screen based on touch state information and touch type information determined from the image, wherein, to acquire the pre-preprocessed image, the at least one processor is configured to:

segment the image to which the noise filtering is applied into a plurality of areas, and acquire the pre-processed image including gray level information corresponding to the plurality of areas, wherein, to acquire the touch coordinate, the at least one processor is further configured to:

input the pre-processed image into the artificial intelligence model and acquire the touch coordinate information corresponding to the touch input, and wherein, to acquire the pre-processed image, the at least one processor is further configured to:

based on acquiring the image while the electronic apparatus is located in a first direction, apply noise filtering to the image and acquire the pre-processed image, and based on acquiring the image while the electronic apparatus is located in a second direction different from the first direction, apply noise filtering to the image and rotate the image to which the noise filtering is applied from the second direction to the first direction to acquire the pre-processed image.

2. The electronic apparatus of claim 1,
wherein the artificial intelligence model comprises:
a first layer block configured to output touch state information, a second layer block configured to output touch type information, and a third layer block configured to output a touch coordinate, and
wherein the artificial intelligence model is configured such that an output of the first layer block is provided to the second layer block, and an output of the second layer block is provided to the third layer block.

3. The electronic apparatus of claim 2,
wherein the first layer block is configured to output touch state information of at least one of a wet state or a dry state, and
the second layer block is configured to output first type information of a finger touch or a non-finger touch, second type information of an entire finger touch, or a partial finger touch, or third type information of a thumb touch.

4. The electronic apparatus of claim 2,
wherein the artificial intelligence model further comprises:
a first operation block configured to concatenate the output of the first layer block and the output of the second layer block, and a second operation block configured to concatenate the output of the third layer block and the output of the first operation block, and
wherein the touch coordinate is acquired based on an output of the second operation block.

5. The electronic apparatus of claim 2,
wherein the first layer block, the second layer block, and the third layer block are each implemented as a convolution neural network (CNN),
wherein the artificial intelligence model comprises:
a first middle layer located between the first layer block and the second layer block, and a second middle layer located between the second layer block and the third layer block, and
wherein the first middle layer and the second middle layer are implemented as a recurrent neural network (RNN).

6. The electronic apparatus of claim 5,
wherein the at least one processor is configured to:
acquire a plurality of images including capacitive information corresponding to a plurality of touch inputs in which each touch input is input at a different time,
input the plurality of images into the artificial intelligence model and acquire touch coordinates corresponding to the plurality of touch inputs, and
the artificial intelligence model is configured to:
based on the plurality of images being input into the first layer block, input an output of the first layer block into the first middle layer and input an output of the first middle layer into the second layer block, and input an output of the second layer block into the second middle layer and input an output of the second middle layer into the third layer block.

7. The electronic apparatus of claim 6,
wherein the artificial intelligence model further comprises:
a third operation block concatenating an output of the first middle layer and an output of the second layer block, and a fourth operation block concatenating an output of the third layer block and an output of the second middle layer, and
wherein the touch coordinates are acquired based on an output of the fourth operation block.

8. The electronic apparatus according to claim 1, wherein the artificial intelligence model is a neural network model trained to output a touch coordinate.

9. The electronic apparatus of claim 1, wherein the artificial intelligence model comprises:
a first layer block configured to output touch state information, a second layer block configured to output touch type information, and a third layer block configured to output a touch coordinate,
wherein the first layer block, the second layer block, and the third layer block are each implemented as a convolution neural network (CNN).

10. A method of acquiring touch coordinates of an electronic apparatus comprising a capacitive type touch screen, the method comprising:
acquiring an image including capacitive information corresponding to a touch input;
applying noise filtering to the acquired image by converting the image to a frequency domain image and removing noise from the frequency domain image to acquire a pre-processed image; and
inputting the pre-processed image into an artificial intelligence model configured to output a touch coordinate corresponding to a location of the touch input on the capacitive type touch screen based on touch state information and touch type information determined from the image,
wherein the acquiring the pre-processed image further comprises:
segmenting the image to which the noise filtering is applied into a plurality of areas, and acquiring the pre-processed image including gray level information corresponding to the plurality of areas,
wherein the acquiring the touch coordinate further comprises:
inputting the pre-processed image into the artificial intelligence model and acquiring the touch coordinate information corresponding to the touch input, and
wherein the acquiring the pre-processed image further comprises:
based on acquiring the image while the electronic apparatus is located in a first direction, applying noise filtering to the image and acquiring the pre-processed image, and
based on acquiring the image while the electronic apparatus is located in a second direction different from the first direction, applying noise filtering to the image and rotating the image to which the noise filtering is applied from the second direction to the first direction to acquire the pre-processed image.

11. A non-transitory computer readable medium storing a computer instruction causing at least one processor of an electronic apparatus to execute a method comprising:
acquiring an image including capacitive information corresponding to a touch input;
applying noise filtering to the acquired image by converting the image to a frequency domain image and removing noise from the frequency domain image to acquire a pre-processed image; and
inputting the pre-processed image into an artificial intelligence model configured to output a touch coordinate corresponding to a location of the touch input on a capacitive type touch screen based on touch state information and touch type information determined from the image, wherein the acquiring the pre-processed image further comprises:

segmenting the image to which the noise filtering is applied into a plurality of areas, and acquiring the pre-processed image including gray level information corresponding to the plurality of areas, wherein the acquiring the touch coordinate comprises:

inputting the pre-processed image into the artificial intelligence model and acquiring the touch coordinate information corresponding to the touch input, and wherein the acquiring the pre-processed image comprises:

based on acquiring the image while the electronic apparatus is located in a first direction, applying noise filtering to the image and acquiring the pre-processed image, and based on acquiring the image while the electronic apparatus is located in a second direction different from the first direction, applying noise filtering to the image and rotating the image to which the noise filtering is applied from the second direction to the first direction to acquire the pre-processed image.

12. The non-transitory computer readable medium according to claim 11, wherein the artificial intelligence model comprises:

a first layer block configured to output touch state information, a second layer block configured to output touch type information, and a third layer block configured to output a touch coordinate, and wherein the artificial intelligence model is configured such that an output of the first layer block is provided to the second layer block, and an output of the second layer block is provided to the third layer block.

13. The non-transitory computer readable medium according to claim 12, wherein the first layer block is configured to output touch state information of at least one of a wet state or a dry state, and the second layer block is configured to output first type information of a finger touch or a non-finger touch, second type information of an entire finger touch, or a partial finger touch, or third type information of a thumb touch.

* * * * *